(12) United States Patent
Yeiser

(10) Patent No.: US 12,516,754 B1
(45) Date of Patent: Jan. 6, 2026

(54) HOSE ASSEMBLY HAVING ADJUSTABLE SLEEVE

(71) Applicant: John O. Yeiser, Alpine, CA (US)

(72) Inventor: John O. Yeiser, Alpine, CA (US)

(73) Assignee: Telebrands Corporation, Fairfield, NJ (US)

( * ) Notice: Subject to any disclaimer, the term of this patent is extended or adjusted under 35 U.S.C. 154(b) by 0 days.

(21) Appl. No.: 17/169,239

(22) Filed: Feb. 5, 2021

Related U.S. Application Data

(60) Provisional application No. 62/971,060, filed on Feb. 6, 2020.

(51) Int. Cl.

| | |
|---|---|
| *F16L 11/12* | (2006.01) |
| *F16L 11/118* | (2006.01) |
| *F16L 35/00* | (2006.01) |
| *F16L 3/00* | (2006.01) |
| *F16L 11/02* | (2006.01) |
| *F16L 11/10* | (2006.01) |
| *F16L 11/115* | (2006.01) |
| *F16L 11/15* | (2006.01) |
| *F16L 31/00* | (2006.01) |

(52) U.S. Cl.
CPC ............ *F16L 11/12* (2013.01); *F16L 11/121* (2013.01); *F16L 35/00* (2013.01); *F16L 3/003* (2013.01); *F16L 11/02* (2013.01); *F16L 11/10* (2013.01); *F16L 11/115* (2013.01); *F16L 11/118* (2013.01); *F16L 11/15* (2013.01); *F16L 31/00* (2013.01); *Y10S 138/08* (2013.01)

(58) Field of Classification Search
CPC . F16L 3/003; F16L 35/00; F16L 3/015; F16L 35/005; Y10S 138/08
USPC .................................. 138/110, 109; 239/588
See application file for complete search history.

(56) References Cited

U.S. PATENT DOCUMENTS

| | | | | |
|---|---|---|---|---|
| 1,091,759 | A | * | 3/1914 | Paradis .................. F16L 33/01 138/135 |
| 2,061,987 | A | * | 11/1936 | Sorensen .................. B05B 1/18 239/588 |
| 2,102,010 | A | | 12/1937 | Kopp |
| 3,623,513 | A | * | 11/1971 | Dinkelkamp ........... F16L 11/14 138/135 |
| 3,705,779 | A | * | 12/1972 | Zon ..................... B29C 49/0021 425/538 |
| 3,819,849 | A | * | 6/1974 | Baker .................. H02G 15/192 174/68.3 |
| 3,831,635 | A | | 8/1974 | Burton |
| 4,463,779 | A | * | 8/1984 | Wink ..................... F16L 11/121 138/133 |
| 4,467,837 | A | * | 8/1984 | Baker .................. B29C 66/729 138/119 |
| 4,669,508 | A | * | 6/1987 | Neaves .................. F16L 11/112 138/121 |

(Continued)

*Primary Examiner* — Kenneth Rinehart
*Assistant Examiner* — Richard K. Durden
(74) *Attorney, Agent, or Firm* — Pryor Cashman LLP

(57) ABSTRACT

A hose assembly including a hose having a first end, a second end, and a substantially hollow interior, and an adjustable sleeve extending over or under at least a portion of the hose, where the adjustable sleeve is varyingly configurable, and where the adjustable sleeve is capable of being adjusted from a first configuration to a second configuration and maintained in the second configuration, where configuration of the adjustable sleeve correspondingly adjusts a configuration of the hose.

13 Claims, 50 Drawing Sheets

(56) References Cited

U.S. PATENT DOCUMENTS

| | | | |
|---|---|---|---|
| 4,669,757 A | 6/1987 | Bartholomew | |
| 4,683,917 A | 8/1987 | Bartholomew | |
| 4,966,202 A * | 10/1990 | Bryan | F16L 11/15 138/139 |
| 4,988,466 A * | 1/1991 | Jarvenkyla | B29C 48/303 425/149 |
| 5,036,890 A | 8/1991 | Whaley | |
| 5,246,254 A | 9/1993 | LoJacono, Jr. | |
| 5,263,646 A * | 11/1993 | McCauley | B05B 15/652 239/588 |
| 5,286,068 A | 2/1994 | Wiebe | |
| 5,316,348 A | 5/1994 | Franklin | |
| 5,619,015 A * | 4/1997 | Kirma | H01R 24/564 174/126.3 |
| 5,667,146 A * | 9/1997 | Pimentel | E03C 1/06 4/615 |
| 5,816,622 A | 10/1998 | Carter | |
| 5,817,980 A * | 10/1998 | Kirma | H02G 3/06 174/68.3 |
| 5,894,866 A | 4/1999 | Horst | |
| 6,105,620 A * | 8/2000 | Haberl | F16L 11/20 138/148 |
| 6,106,027 A * | 8/2000 | Mulvey | E03C 1/0403 285/251 |
| 6,164,570 A * | 12/2000 | Smeltzer | F16L 11/18 138/120 |
| 6,223,777 B1 | 5/2001 | Smith | |
| 6,557,589 B2 * | 5/2003 | Bozic | F16L 3/00 138/110 |
| 6,568,610 B1 | 5/2003 | Ericksen | |
| 6,955,189 B1 * | 10/2005 | Weyker | F16L 11/121 138/119 |
| 6,983,757 B1 | 1/2006 | Becker | |
| 7,168,451 B1 * | 1/2007 | Dundas | F16L 37/146 138/155 |
| D586,435 S | 2/2009 | Reckseen | |
| 7,891,382 B2 * | 2/2011 | Rushlander | F16L 11/112 138/119 |
| 8,291,941 B1 | 10/2012 | Berardi | |
| D832,984 S | 11/2018 | Khubani | |
| D833,585 S | 11/2018 | Khubani | |
| D834,154 S | 11/2018 | Khubani | |
| D835,244 S | 12/2018 | Khubani | |
| 2009/0194186 A1 * | 8/2009 | Gross | F16L 35/00 138/172 |
| 2010/0154915 A1 * | 6/2010 | Wu | E03C 1/0408 138/135 |
| 2018/0195648 A1 * | 7/2018 | Yeiser | F16L 33/2076 |
| 2018/0347738 A1 * | 12/2018 | Zhang | F16L 33/01 |
| 2019/0316710 A1 * | 10/2019 | Yeiser, IV | F16L 27/04 |

* cited by examiner

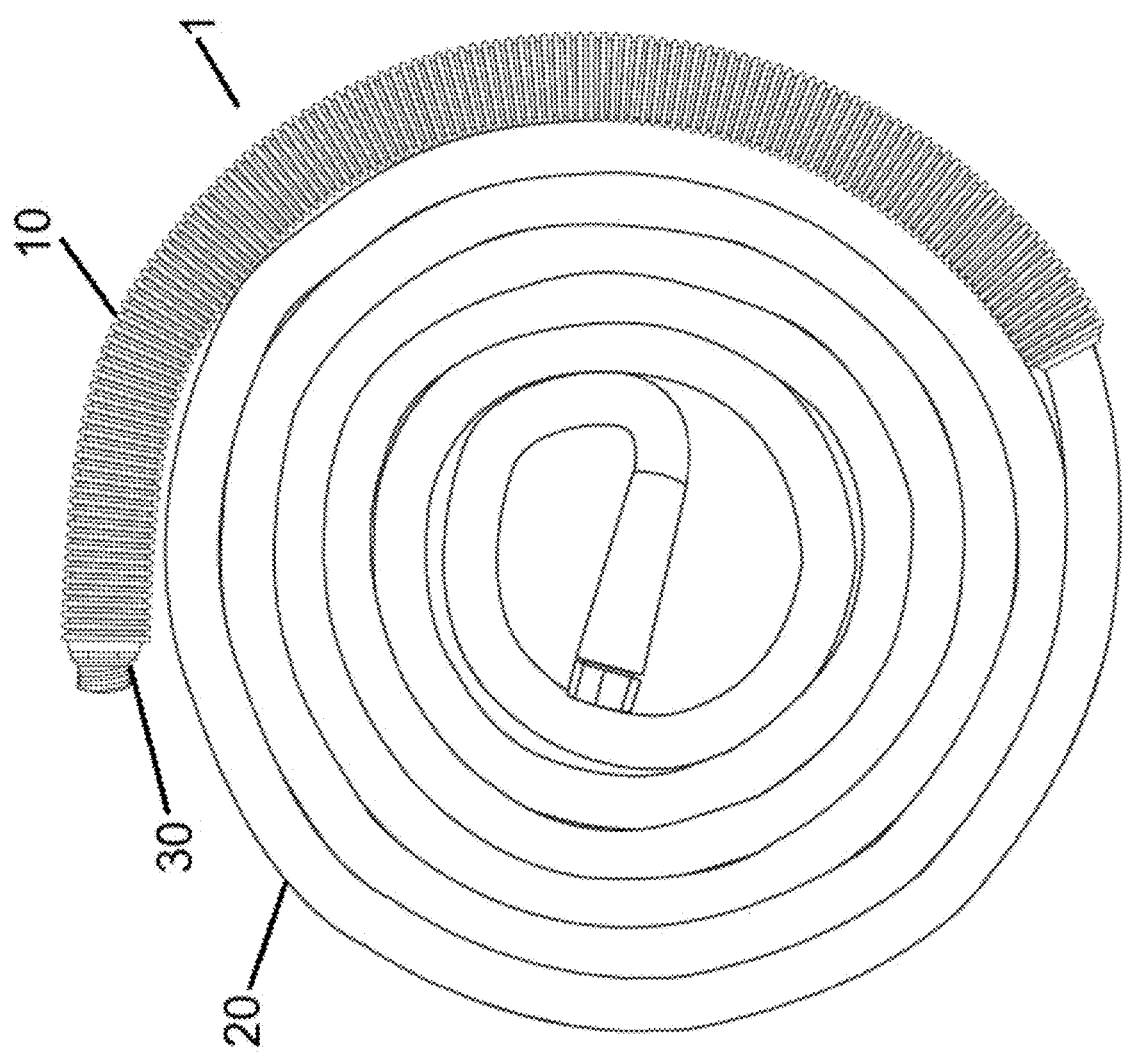

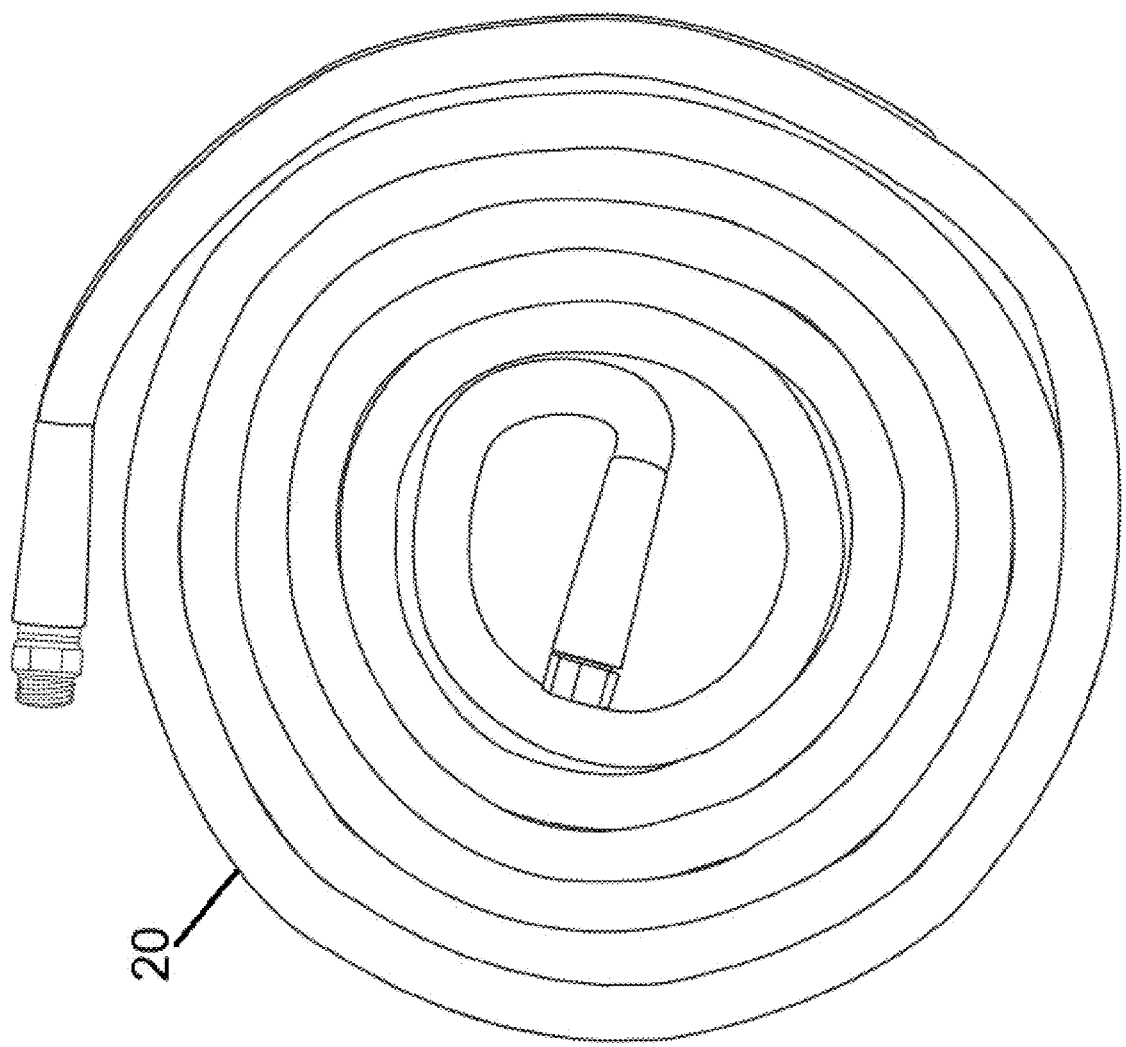

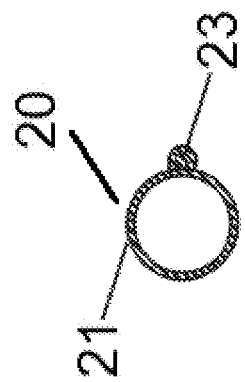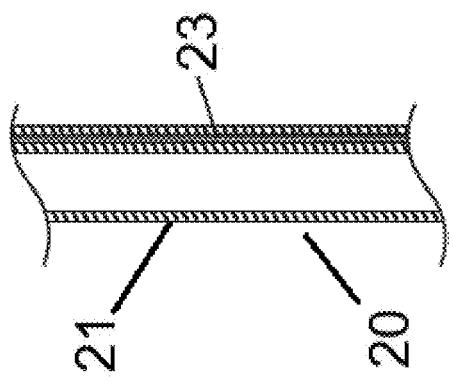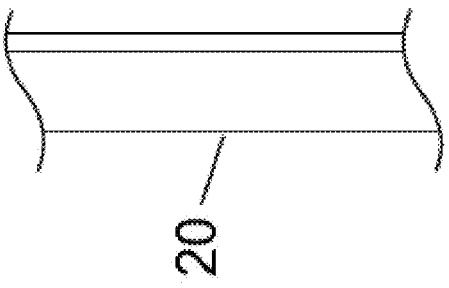

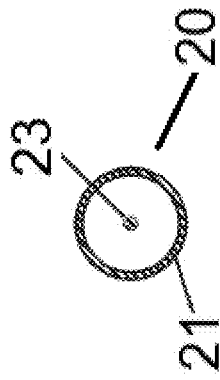
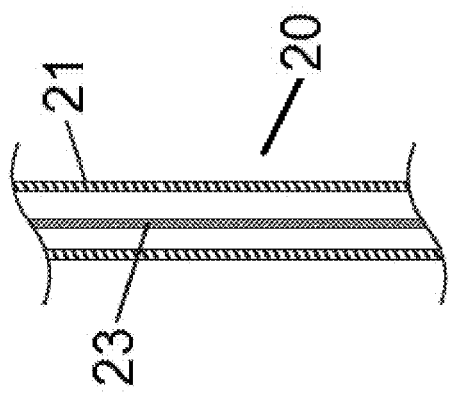
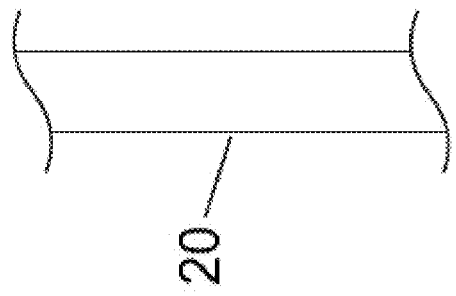

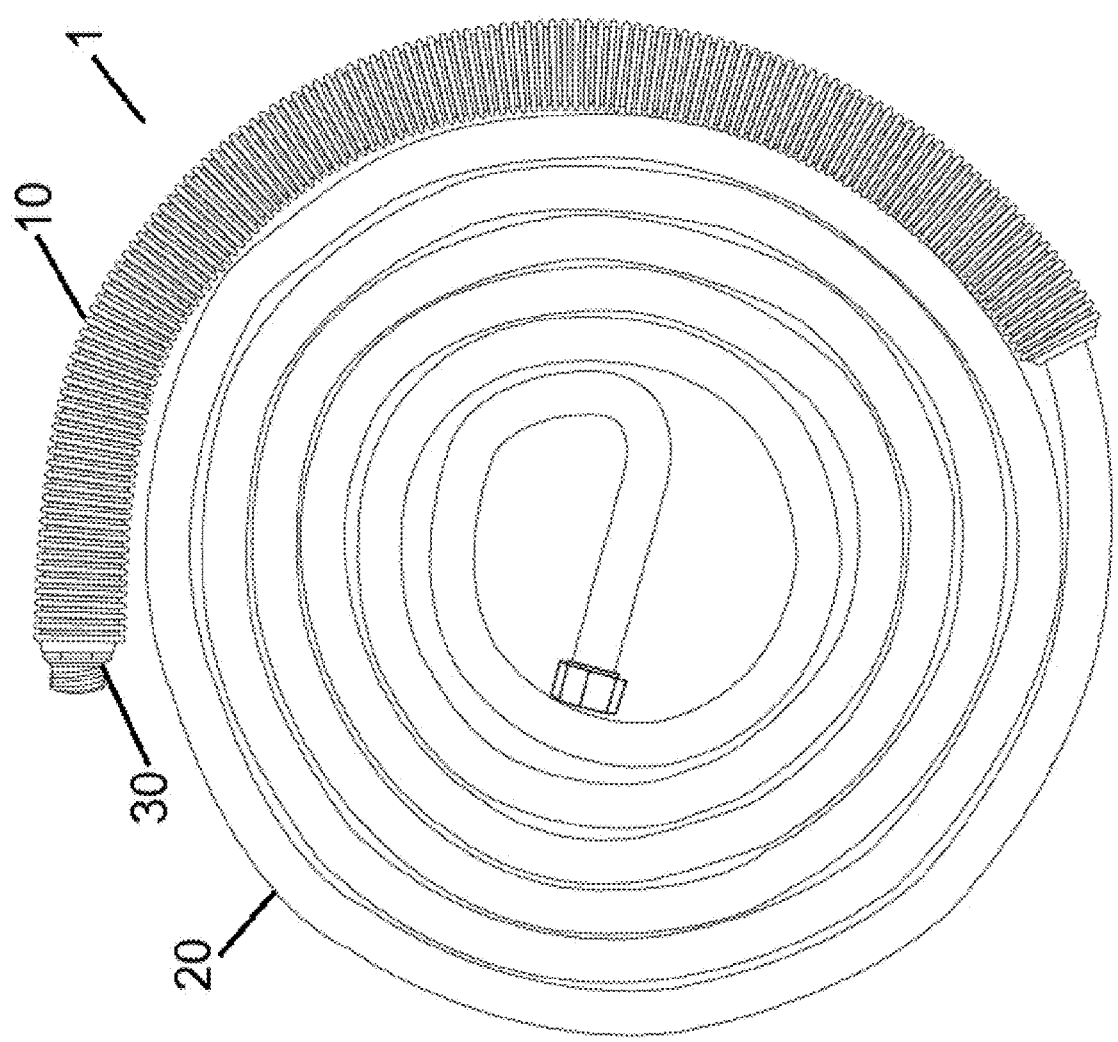

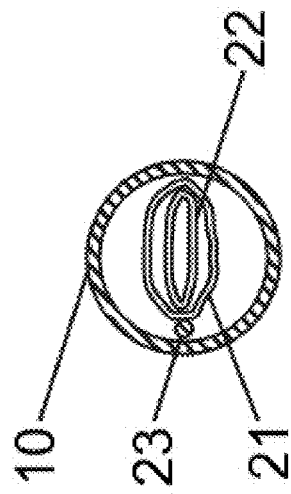
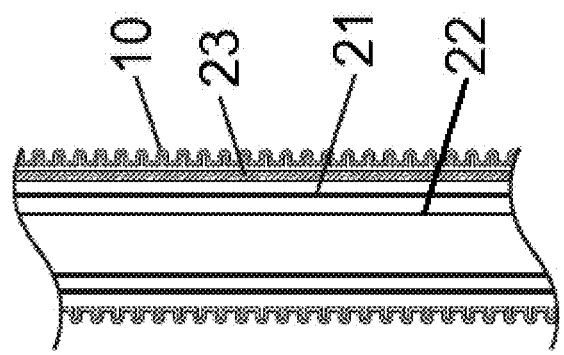
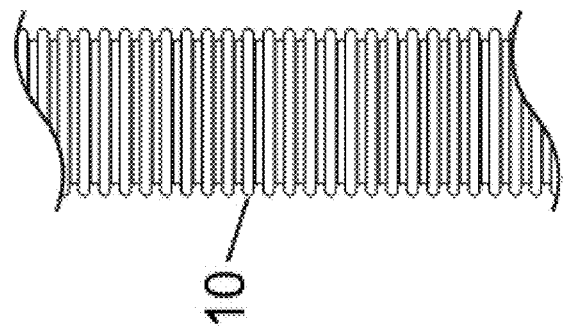

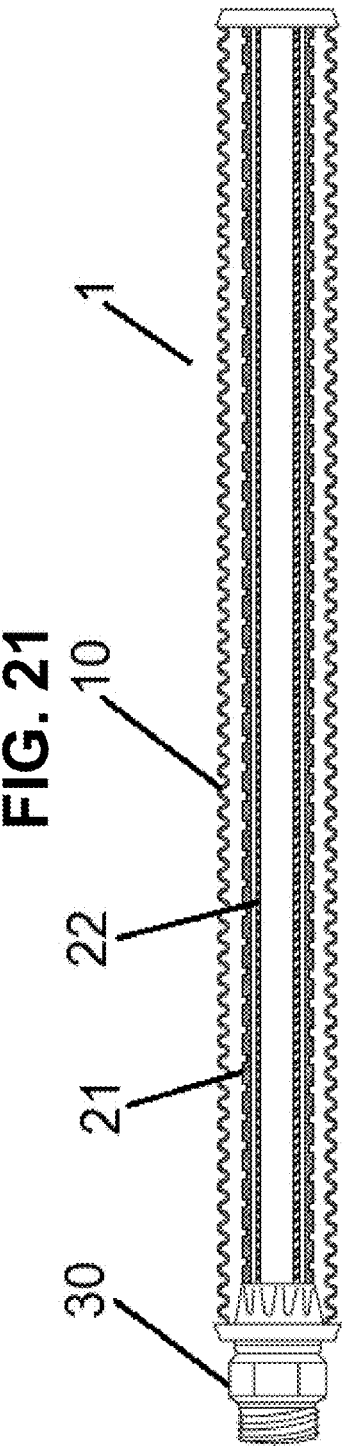
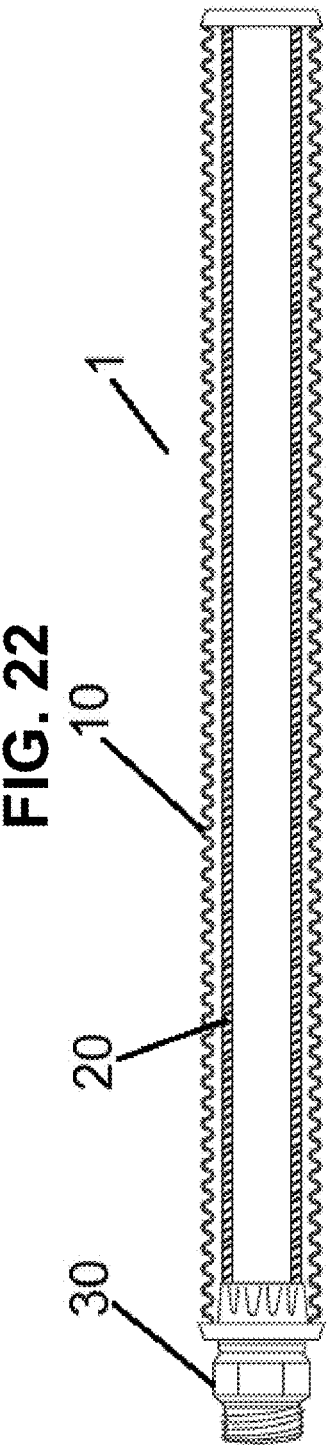
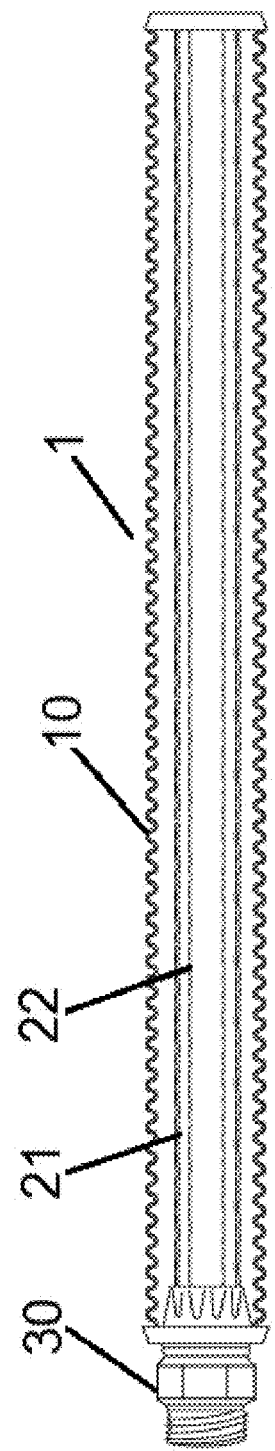
FIG. 21
FIG. 22
FIG. 23

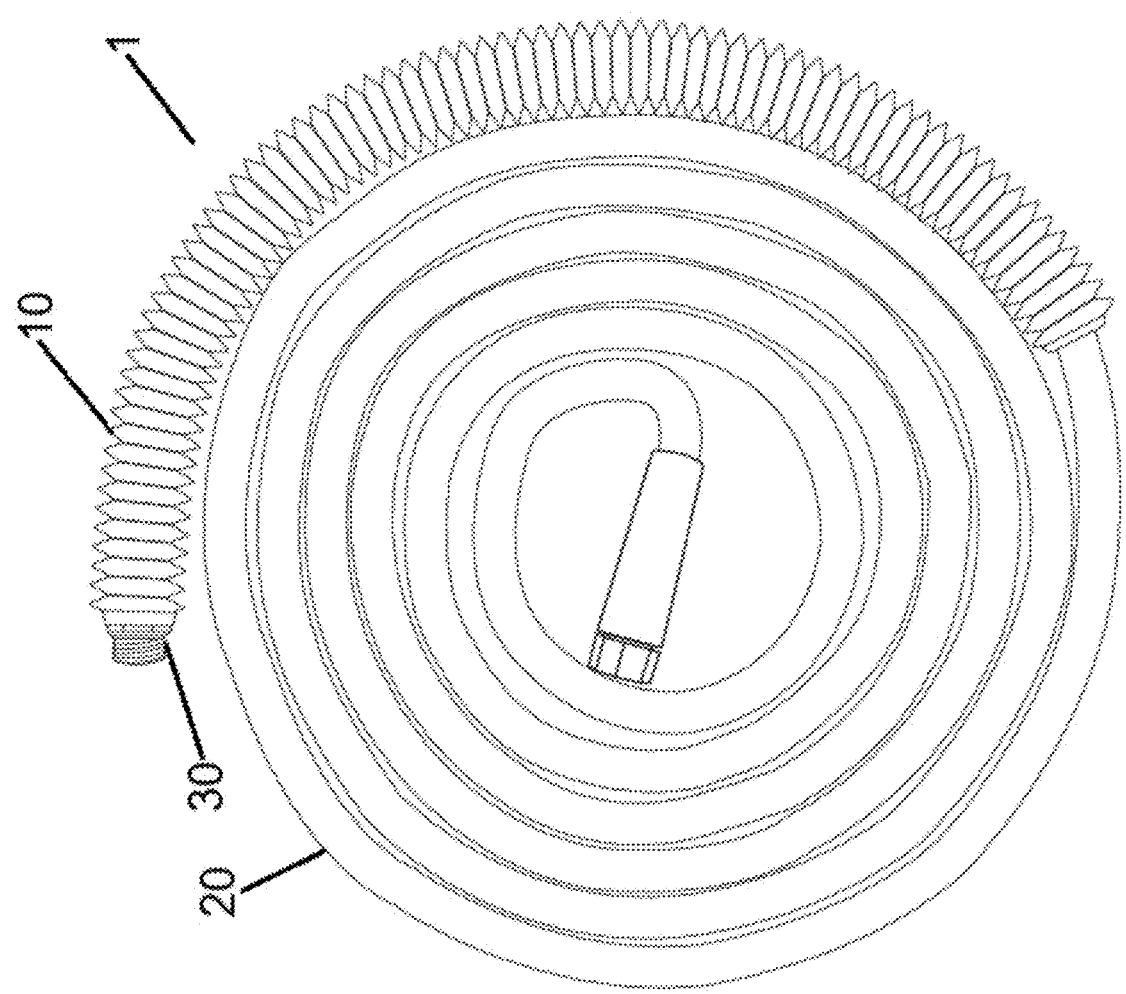

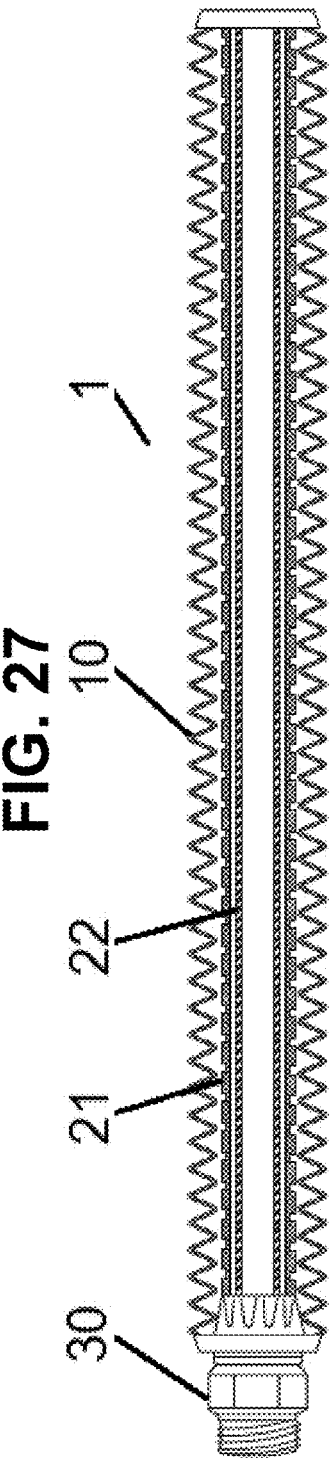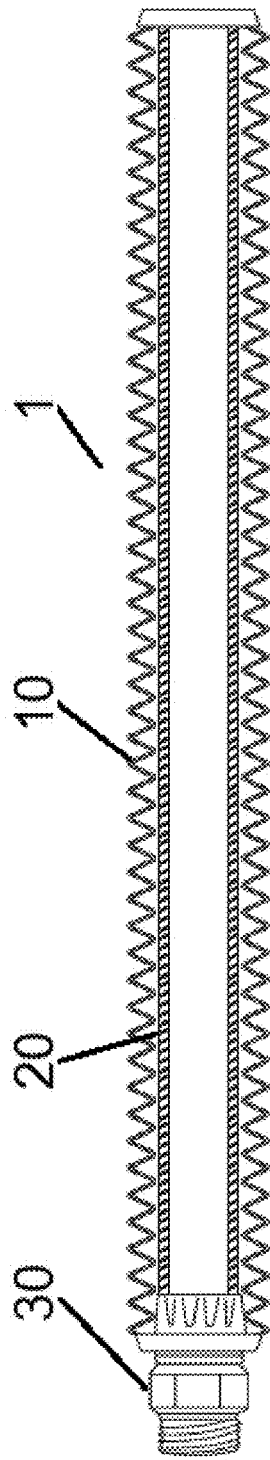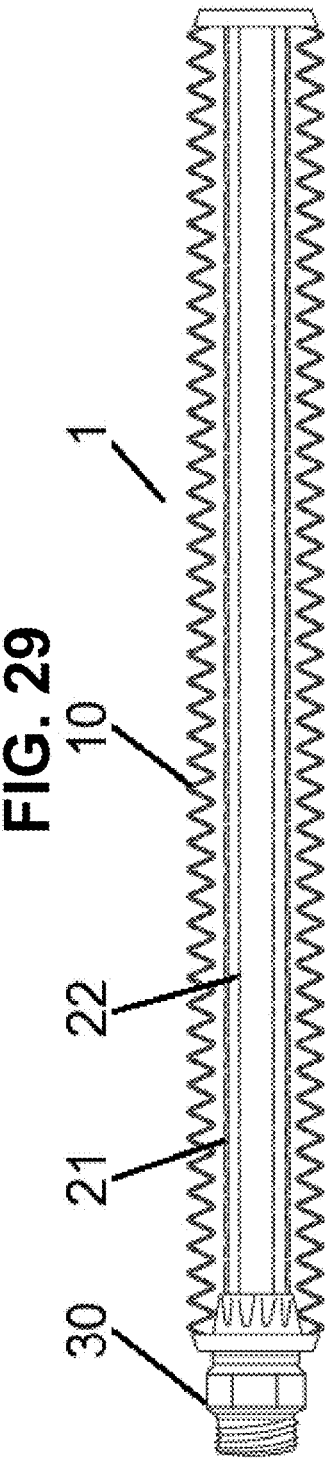

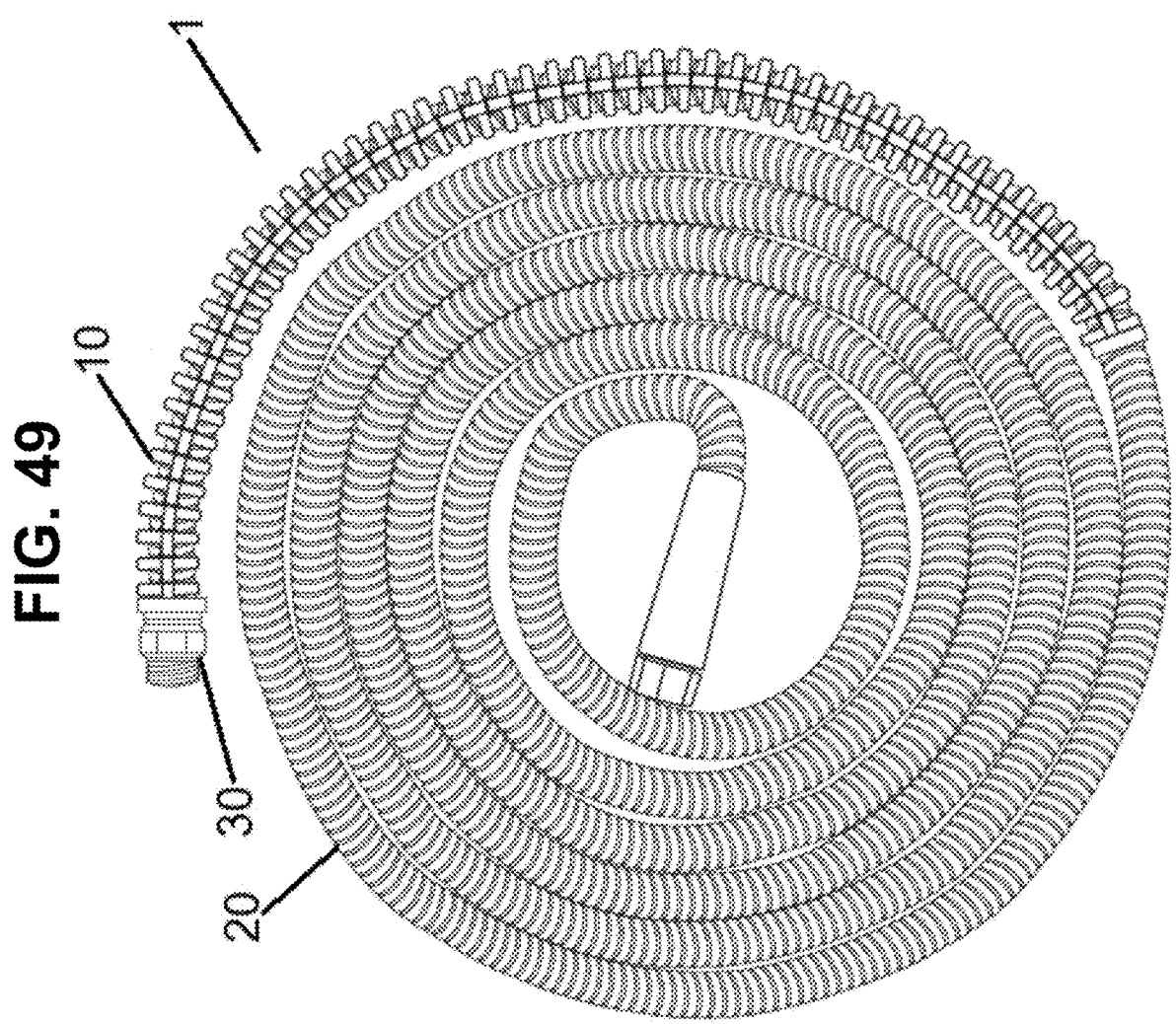

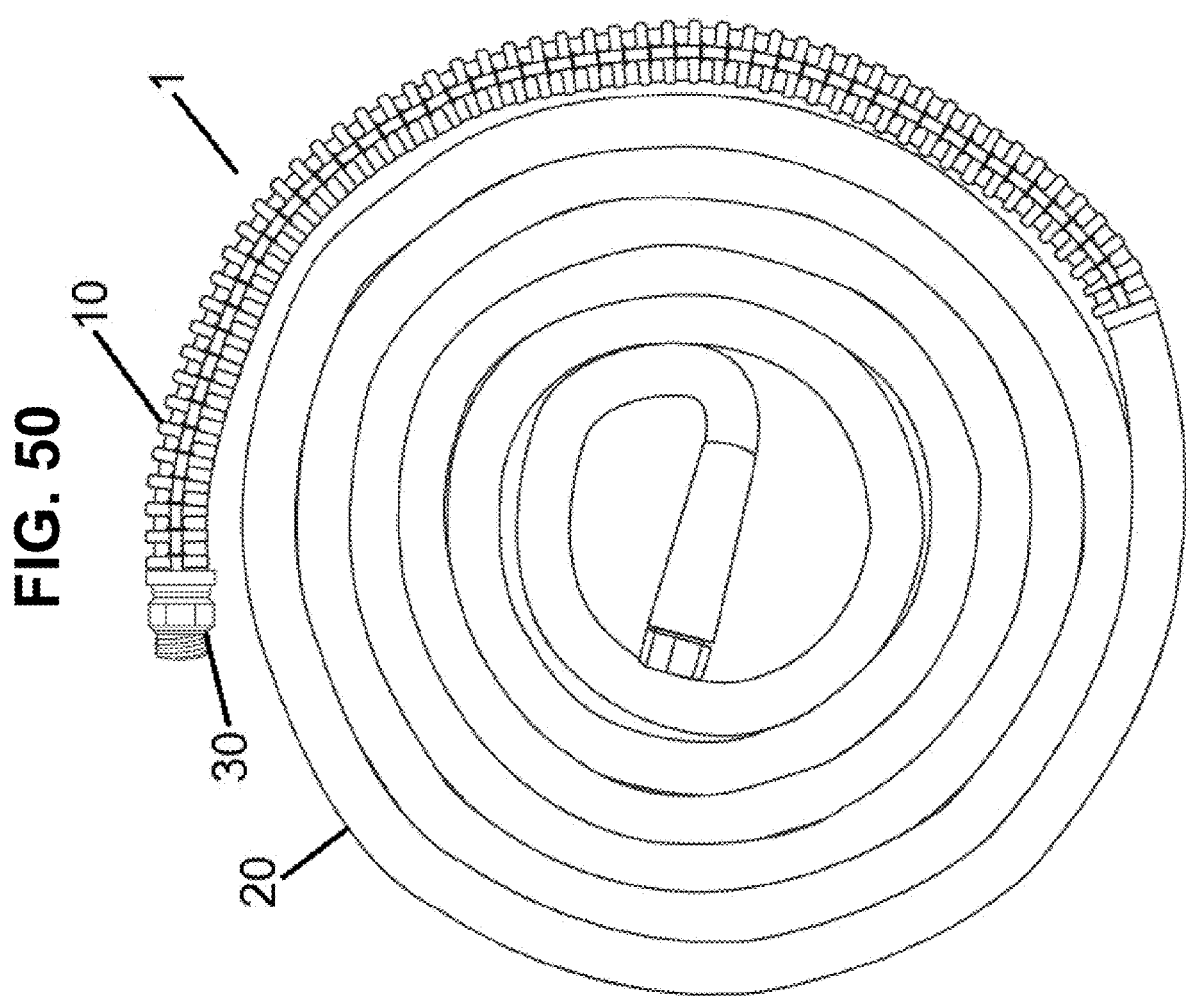

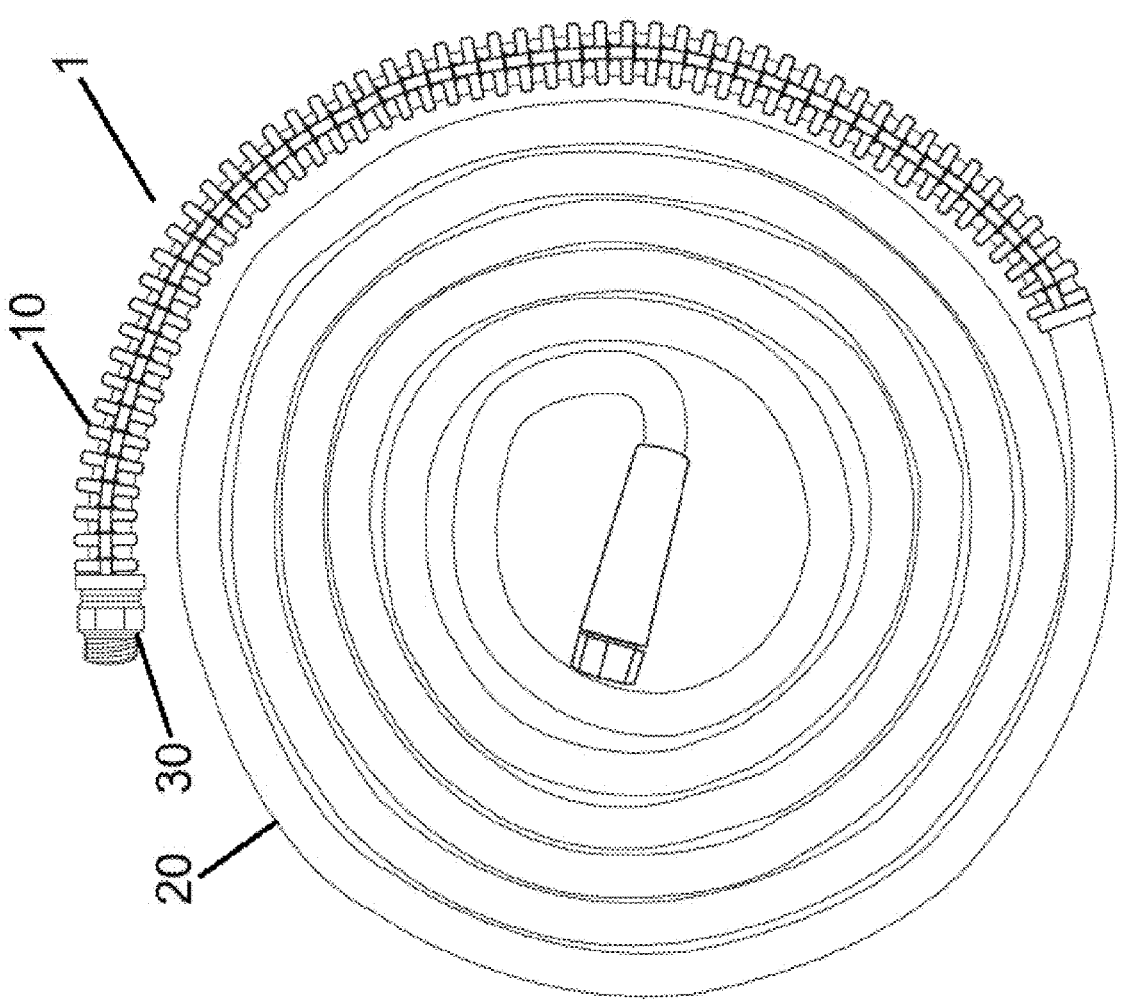

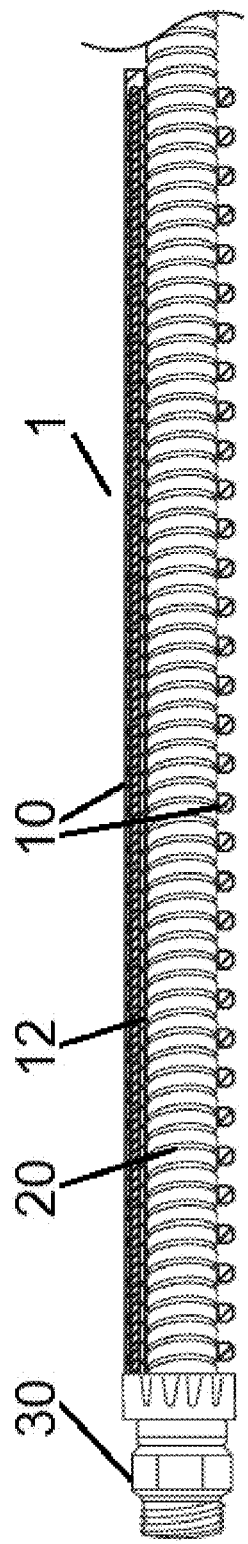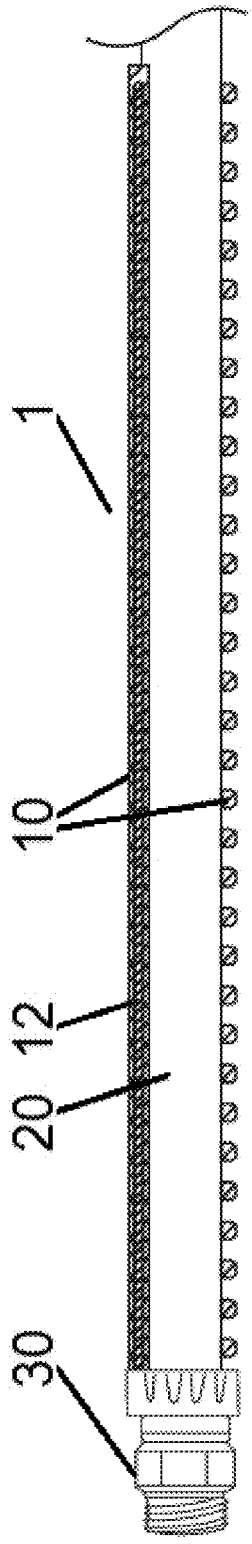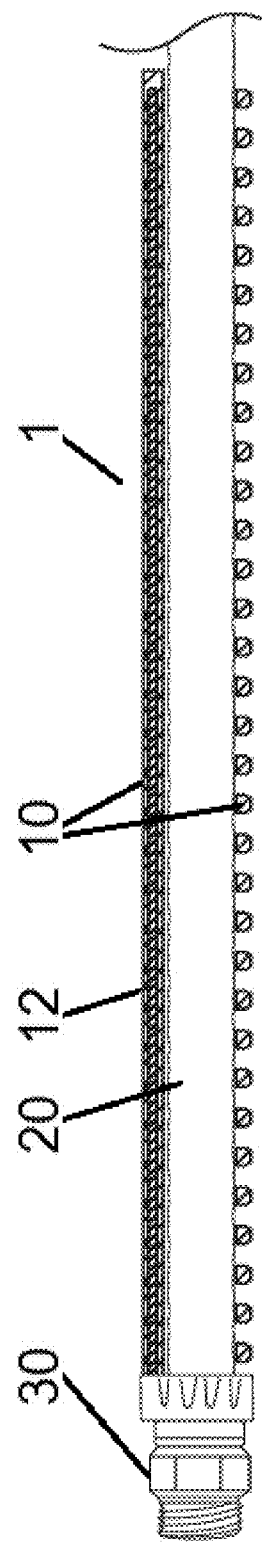

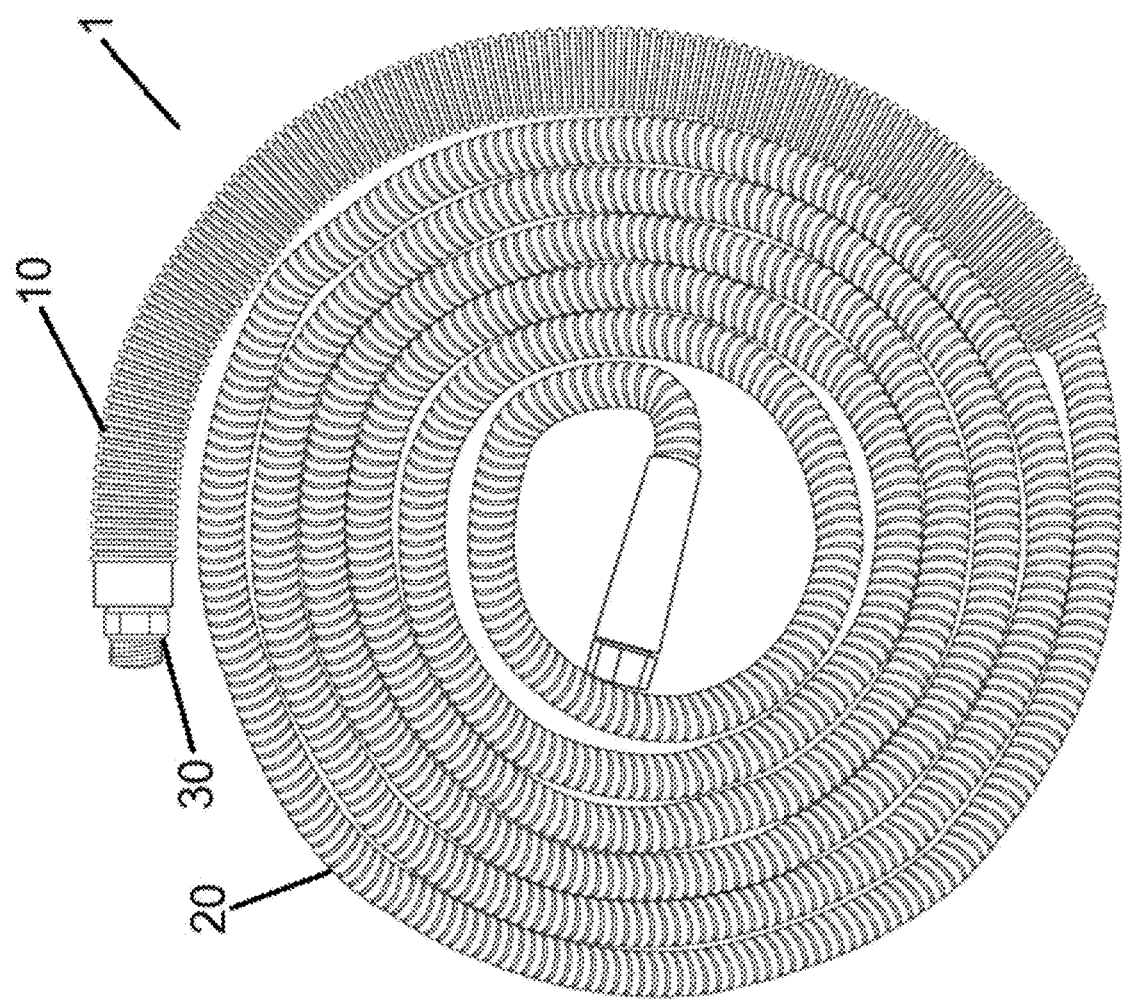

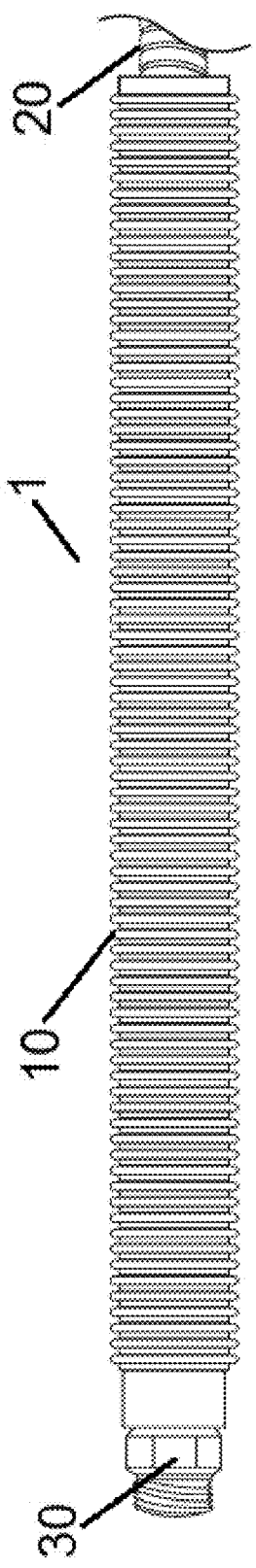
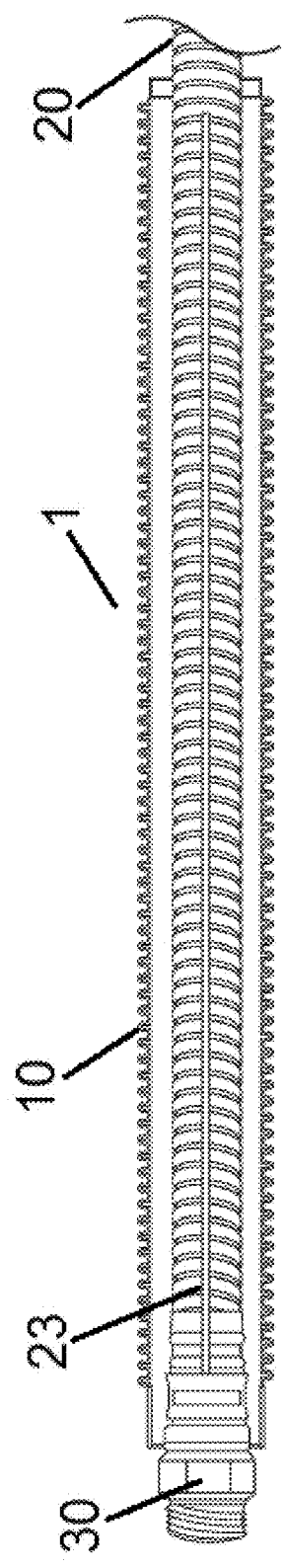
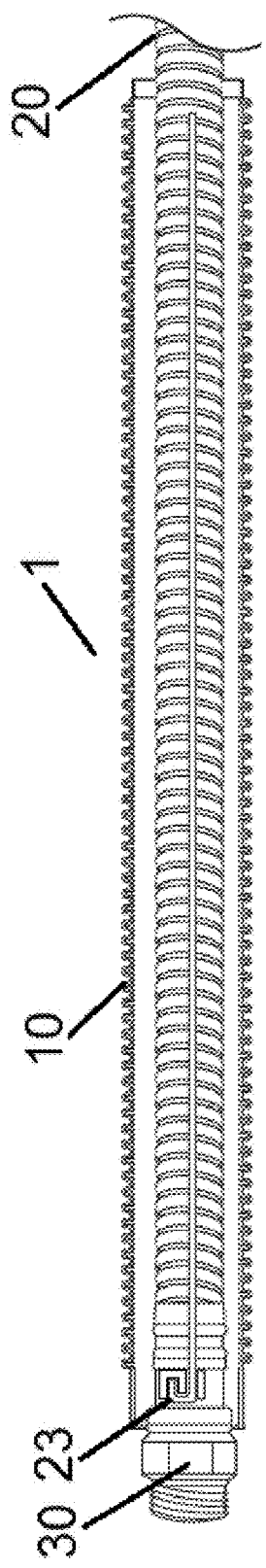

HOSE ASSEMBLY HAVING ADJUSTABLE SLEEVE

CROSS-REFERENCE TO RELATED APPLICATIONS

The present application claims priority to U.S. provisional application Ser. No. 62/971,060, filed Feb. 6, 2020, the disclosure of which is incorporated herein by reference in its entirety.

TECHNICAL FIELD

The present invention relates to a hose assembly having an adjustable sleeve. More specifically, the present invention relates to a hose assembly having an adjustable sleeve disposed adjacent to one or more end couplers or connectors, e.g., to maintain at least a portion of the hose assembly in a particular position or configuration.

BACKGROUND OF THE INVENTION

Hoses, such as garden hoses, are often flexible, which permits movement and contortion in manipulating the hoses. However, this property of hoses also results in difficulty keeping the hoses in a desired configuration, particularly when water is flowing through the hoses. In this situation, the end of a hose may thrash around and, at a minimum, fall out of the desired position. This may be unhelpful for many tasks, including gardening, lawn care, pool maintenance, children's water activities, and the like, where maintaining the position or configuration of the hose is critical to accomplishing the relevant task. Thus, there is a need for a hose including a sufficiently rigid yet flexible element in order to adjust and maintain a hose in a desired position or configuration.

SUMMARY OF THE INVENTION

In general, in one aspect, the invention features a hose assembly including a hose having a first end, a second end, and a substantially hollow interior, and an adjustable sleeve extending over or under at least a portion of the hose, where the adjustable sleeve is varyingly configurable, and where the adjustable sleeve is capable of being adjusted from a first configuration to a second configuration and maintained in the second configuration, where configuration of the adjustable sleeve correspondingly adjusts a configuration of the hose.

Implementations of the invention may include one or more of the following features. The adjustable sleeve may be disposed over or on top of the hose, or under or within the hose. The adjustable sleeve may be fixedly or permanently attached or connected to the hose, or reversibly attachable to and removable from the hose.

The adjustable sleeve may be a ribbed tube. The adjustable sleeve may be composed of a metal, a plastic, acrylonitrile butadiene styrene (ABS), a thermoplastic, a thermoplastic elastomer, a thermoplastic rubber, or a silicone. The adjustable sleeve may be an extruded bendable sleeve, a blow-molded sleeve, an injection-molded sleeve, or a rotational-molded sleeve. The adjustable sleeve may be varyingly configurable over its entire length. The adjustable sleeve may be approximately 24 to 32 inches in length. The adjustable sleeve may be approximately the same length as the hose.

The hose assembly may further include at least one end coupler attached or connected to the hose at the first end or the second end. The adjustable sleeve may be disposed adjacent to the at least one end coupler. The adjustable sleeve may be attached or connected to the at least one end coupler. The at least one end coupler may be an outlet end coupler.

The hose may be an expandable hose, a rubber hose, a lightweight hose, a metal hose, a flat hose, a fabric hose, or a fabric-covered flat hose. The hose may have a fabric or fiber outer covering and an inner elastic tube. The hose assembly may be fixedly or removably attached to an additional component, and the additional component may be a nozzle, a sprinkler, a sprayer, or a shut-off valve.

In general, in another aspect, the invention features an assembly including an adjustable sleeve capable of extending over or under at least a portion of a hose, where the adjustable sleeve is varyingly configurable, and where the adjustable sleeve is capable of being adjusted from a first configuration to a second configuration and maintained in the second configuration, where configuration of the adjustable sleeve correspondingly adjusts a configuration of the hose.

BRIEF DESCRIPTION OF THE DRAWINGS

FIG. 9 shows a hose assembly having an adjustable sleeve according to one embodiment of the present invention, in which the hose assembly includes an extruded bendable sleeve and a rubber base hose;

FIG. 10 shows a rubber base hose configured for the hose assembly of FIG. 9;

FIG. 12A shows a portion of a rubber base hose configured for the hose assembly of FIG. 9;

FIG. 12B shows a longitudinal cross-sectional view of the portion of the rubber base hose of FIG. 12A;

FIG. 12C shows a perpendicular cross-sectional view of the portion of the rubber base hose of FIG. 12A;

FIG. 13A shows a portion of a rubber base hose configured for the hose assembly of FIG. 9;

FIG. 13B shows a longitudinal cross-sectional view of the portion of the rubber base hose of FIG. 13A;

FIG. 13C shows a perpendicular cross-sectional view of the portion of the rubber base hose of FIG. 13A;

FIG. 15 shows a hose assembly having an adjustable sleeve according to one embodiment of the present invention, in which the hose assembly includes an extruded bendable sleeve and a fabric-covered expandable base hose;

FIG. 17A shows a portion of an extruded bendable sleeve and underlying fabric-covered expandable base hose configured for the hose assembly of FIG. 15;

FIG. 17B shows a longitudinal cross-sectional view of the portion of the extruded bendable sleeve and underlying fabric-covered expandable base hose of FIG. 17A;

FIG. 17C shows a perpendicular cross-sectional view of the portion of the extruded bendable sleeve and underlying fabric-covered expandable base hose of FIG. 17A;

FIG. 21 shows a longitudinal cross-sectional view of a portion of a hose assembly having an adjustable sleeve according to one embodiment of the present invention, in which the hose assembly includes a corrugated metal bendable sleeve and a metal base hose;

FIG. 22 shows a longitudinal cross-sectional view of a portion of a hose assembly having an adjustable sleeve according to one embodiment of the present invention, in which the hose assembly includes a corrugated metal bendable sleeve and a rubber base hose;

FIG. 23 shows a longitudinal cross-sectional view of a portion of a hose assembly having an adjustable sleeve according to one embodiment of the present invention, in which the hose assembly includes a corrugated metal bendable sleeve and a fabric-covered expandable base hose;

FIG. 26 shows a hose assembly having an adjustable sleeve according to one embodiment of the present invention, in which the hose assembly includes an accordion plastic bendable sleeve and a fabric-covered expandable base hose;

FIG. 27 shows a longitudinal cross-sectional view of a portion of a hose assembly having an adjustable sleeve according to one embodiment of the present invention, in which the hose assembly includes an accordion plastic bendable sleeve and a metal base hose;

FIG. 28 shows a longitudinal cross-sectional view of a portion of a hose assembly having an adjustable sleeve according to one embodiment of the present invention, in which the hose assembly includes an accordion plastic bendable sleeve and a rubber base hose;

FIG. 29 shows a longitudinal cross-sectional view of a portion of a hose assembly having an adjustable sleeve according to one embodiment of the present invention, in which the hose assembly includes an accordion plastic bendable sleeve and a fabric-covered expandable base hose;

FIG. 49 shows a hose assembly having an adjustable sleeve according to one embodiment of the present invention, in which the hose assembly includes a plastic spine bendable sleeve, an underlying metal wire insert, and a metal base hose;

FIG. 50 shows a hose assembly having an adjustable sleeve according to one embodiment of the present invention, in which the hose assembly includes a plastic spine bendable sleeve, an underlying metal wire insert, and a rubber base hose;

FIG. 51 shows a hose assembly having an adjustable sleeve according to one embodiment of the present invention, in which the hose assembly includes a plastic spine bendable sleeve, an underlying metal wire insert, and a fabric-covered expandable base hose;

FIG. 52 shows a cut-away view of a portion of a hose assembly having an adjustable sleeve according to one embodiment of the present invention, in which the hose assembly includes a plastic spine bendable sleeve, an underlying metal wire insert, and a metal base hose;

FIG. 53 shows a cut-away view of a portion of a hose assembly having an adjustable sleeve according to one embodiment of the present invention, in which the hose assembly includes a plastic spine bendable sleeve, an underlying metal wire insert, and a rubber base hose;

FIG. 54 shows a cut-away view of a portion of a hose assembly having an adjustable sleeve according to one embodiment of the present invention, in which the hose assembly includes a plastic spine bendable sleeve, an underlying metal wire insert, and a fabric-covered expandable base hose;

FIG. 55 shows a hose assembly having an adjustable sleeve according to one embodiment of the present invention, in which the hose assembly includes an extruded bendable sleeve, an underlying metal wire insert, and a metal base hose;

FIG. 56 shows a portion of the hose assembly of FIG. 55;

FIG. 57 shows a first cut-away view of a portion of the hose assembly of FIG. 55;

FIG. 58 shows a second cut-away view of a portion of the hose assembly of FIG. 55;

DETAILED DESCRIPTION OF THE INVENTION

Figure 1:
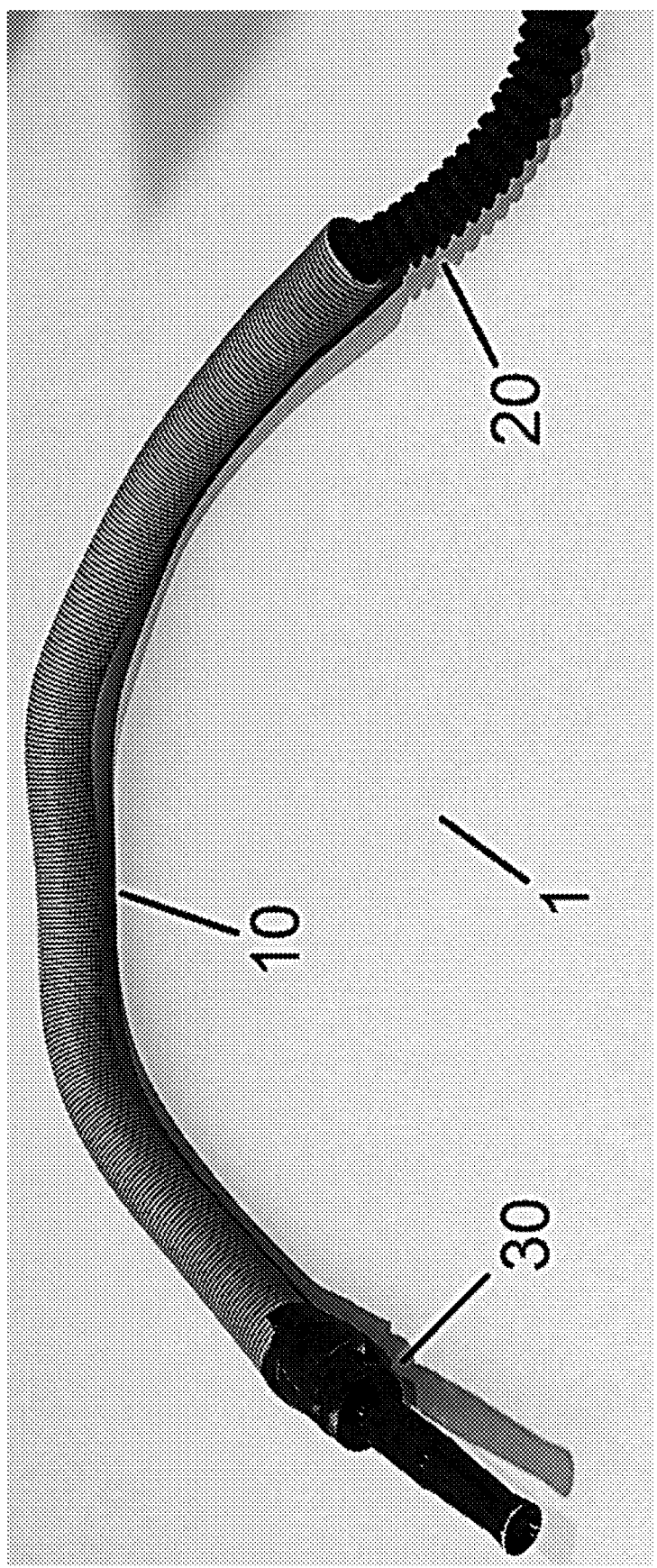
FIG. 1 shows a hose assembly having an adjustable sleeve according to one embodiment of the present invention, in which the hose assembly is configured in a first position.

The present invention is directed to a hose assembly having an adjustable sleeve. The adjustable sleeve is preferably disposed adjacent to one or more end couplers or connectors of the hose assembly, thereby permitting at least a portion of the hose assembly to be maintained in a particular position or configuration. The adjustable sleeve is preferably adjustable, e.g., bendable, over its entire length and can be maintained in the adjusted position or configuration.

The adjustable sleeve is preferably disposed over or under at least a portion, if not the entirety, of a base hose. The adjustable sleeve may be fixedly or permanently attached or connected to the base hose, or may be disposed in or on the base hose as a separate, reversibly attachable component. In certain embodiments of the present invention, the adjustable sleeve is approximately two feet in length and/or provided at least at an outlet end portion of the hose assembly. The adjustable sleeve may take the form of a ribbed tube. The adjustable sleeve may include any industry-accepted material capable of both position adjustment and maintenance, including but not limited to metal, plastic, acrylonitrile butadiene styrene (ABS), thermoplastic, thermoplastic elastomer or rubber, silicone, and the like.

The hose assembly of the present invention preferably includes a base hose that extends under or over a portion, if not the entirety, of the adjustable sleeve. The adjustable sleeve may be substantially circular in cross-section and have a greater or lesser diameter than that of the base hose in cross-section, such that the base hose may fit into or around the adjustable sleeve, respectively. The type or style of the base hose is not limited in the present invention, with examples including but not limited to expandable hoses (e.g., expandable garden hoses), rubber hoses (e.g., rubber garden hoses), lightweight hoses (e. g., lightweight garden hoses), metal hoses (e.g., metal garden hoses), flat or fabric or fabric-covered flat hoses, and the like. The base hose may include a fabric or fiber outer covering and an inner rubber or otherwise elastic tube. The base hose is preferably an expandable hose, such as the POCKET HOSE® expandable hoses sold by Telebrands Corp.

Additionally, the hose assembly of the present invention preferably includes one or more end couplers or connectors of the hose assembly, such as at an inlet end and/or an outlet end of the hose assembly. The end couplers or connectors allow for attachment of the hose assembly, e.g., to a faucet and devices such as nozzles and sprinklers. The end couplers or connectors may be any industry-accepted couplers or connectors, particularly those utilized with the aforementioned base hoses. The end couplers or connectors are preferably threaded. In certain embodiments of the present invention, both the adjustable sleeve and the base hose are attached or connected to an outlet end coupler or connector.

The hose assembly may include or be fixedly or removably attachable to additional hose components, including but not limited to a nozzle, sprinkler, sprayer, or similar attachment, a shut-off valve, and the like.

Figure 2:
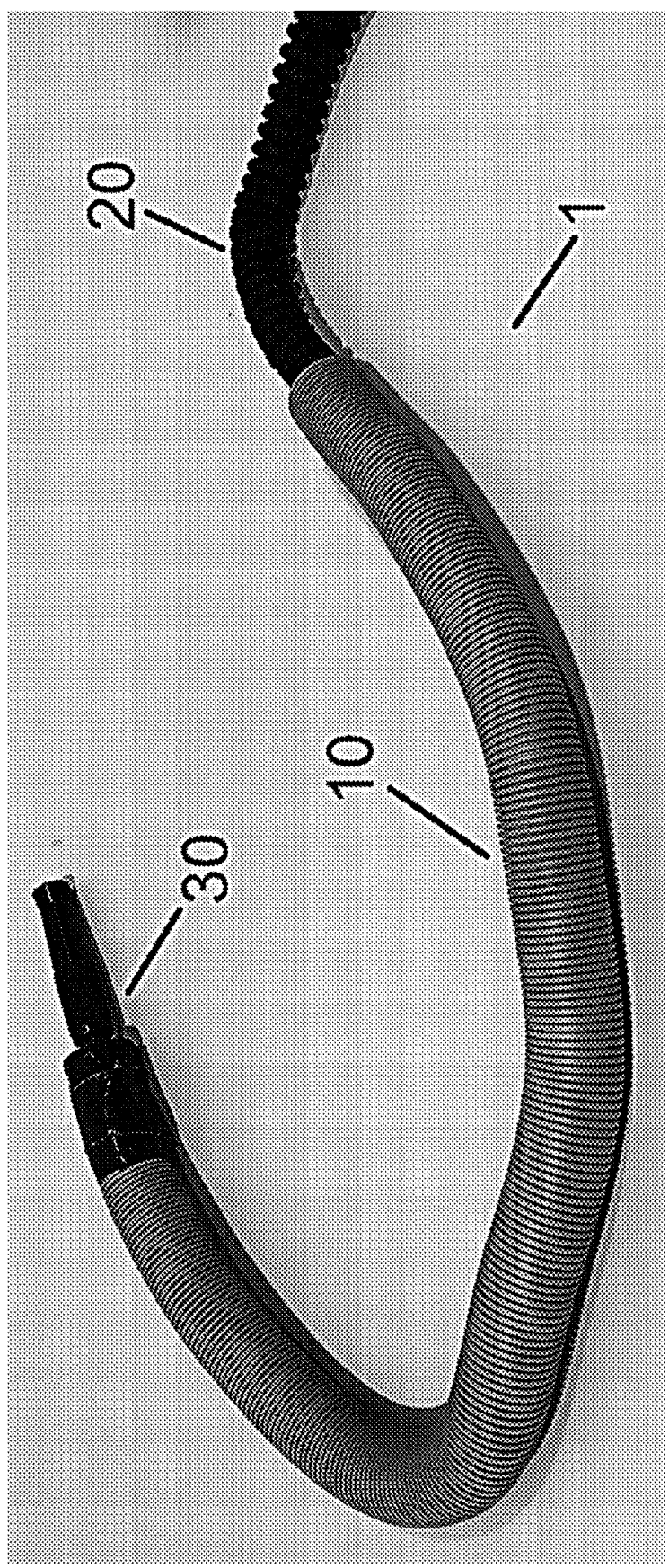
FIG. 2 shows the hose assembly having an adjustable sleeve of FIG. 1, in which the hose assembly is configured in a second position.
Figure 3:
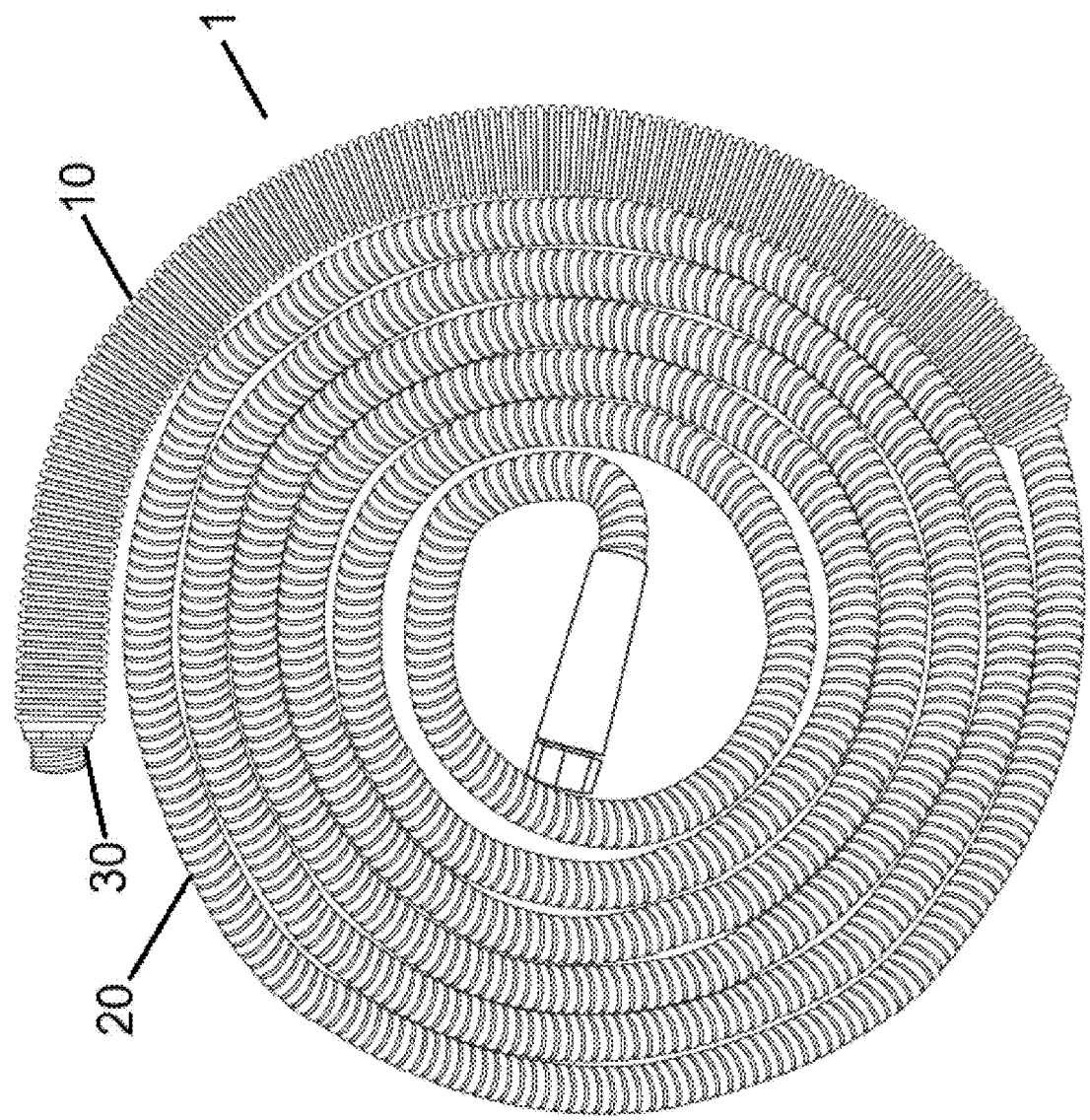
FIG. 3 shows a hose assembly having an adjustable sleeve according to one embodiment of the present invention, in which the hose assembly includes an extruded bendable sleeve and a metal base hose.
Figure 4:
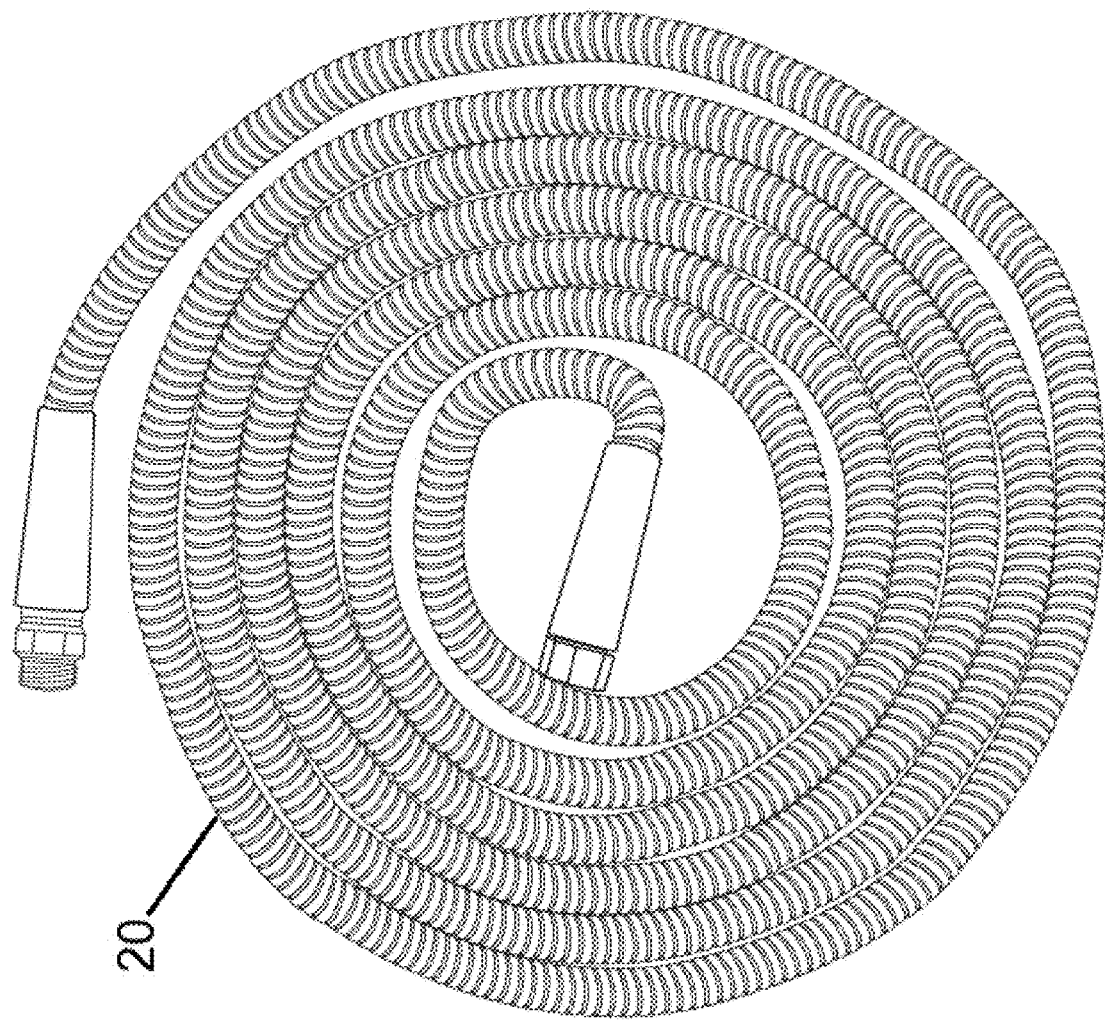
FIG. 4 shows a metal base hose configured for the hose assembly of FIG. 3.
Figure 5:
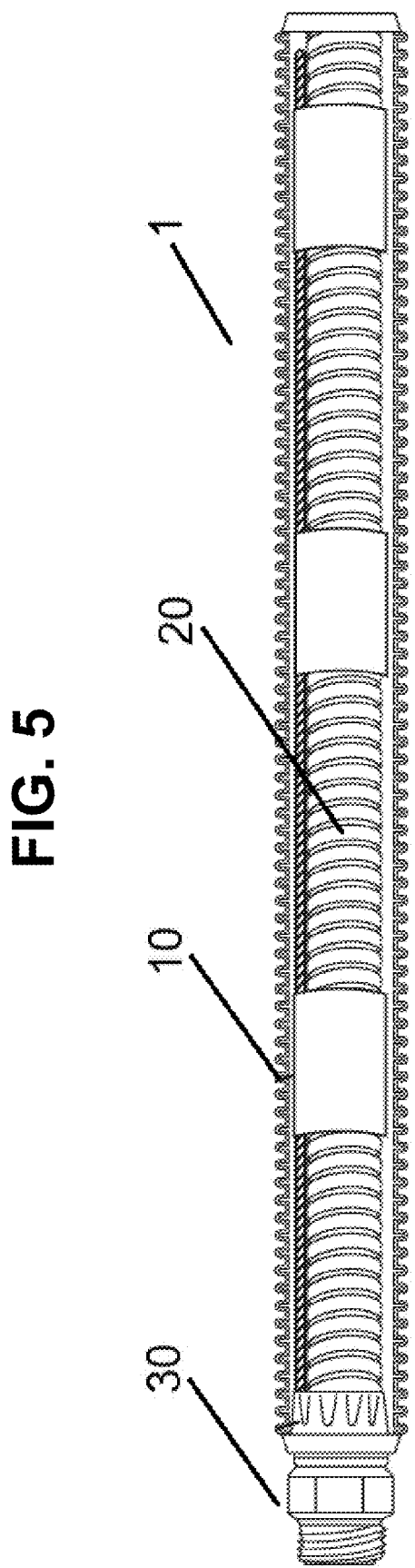
FIG. 5 shows a cut-away view of a portion of the hose assembly of FIG. 3.

FIGS. 1-2 provide exemplary positions for a hose assembly having an adjustable sleeve according to one embodiment of the present invention. Hose assembly 1 includes sleeve 10, hose 20, and connector or coupler 30. As illustrated in FIGS. 1-2, a hose assembly of the present invention is capable of being set in a first position with respect to the adjustable sleeve (e.g., downwardly bent sleeve), and then being bent or otherwise adjusted and maintained in a second position (e.g., upwardly bent sleeve). In embodiments in which the adjustable sleeve is provided at least at an outlet end portion of the hose assembly, such as in FIGS. 1-2, the adjustable sleeve may be bent such that the hose assembly may attach or hook onto an object during a watering operation, including but not limited to a fence or pot/planter for garden or lawn watering, an edge or lip of a pool (above-ground, in-ground, plastic or inflatable children's, etc.) for pool filling, and the like.

FIGS. 3-8 provide several non-limiting variations of a hose assembly of the present in which the hose assembly includes an extruded bendable sleeve and a metal base hose. Sleeve 10 may be approximately 24 to 32 inches in length. In this embodiment, sleeve 10 is an extruded bendable sleeve; however, sleeve 10 may also be a blow-molded sleeve, an injection-molded sleeve, a rotational-molded sleeve, and the like.

Figure 6C:
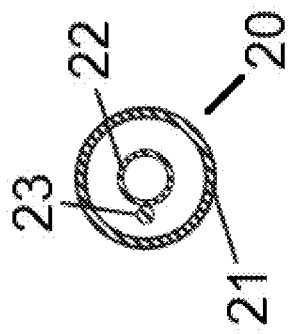
FIG. 6C shows a perpendicular cross-sectional view of the portion of the metal base hose of FIG. 6A.
Figure 6B:
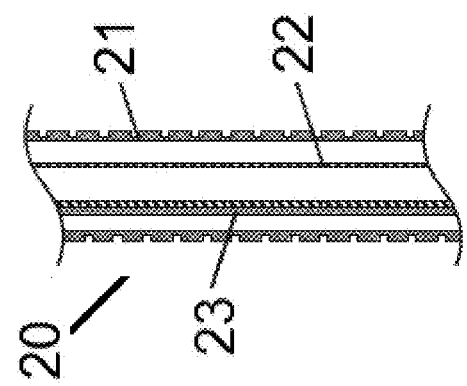
FIG. 6B shows a longitudinal cross-sectional view of the portion of the metal base hose of FIG. 6A.
Figure 6A:
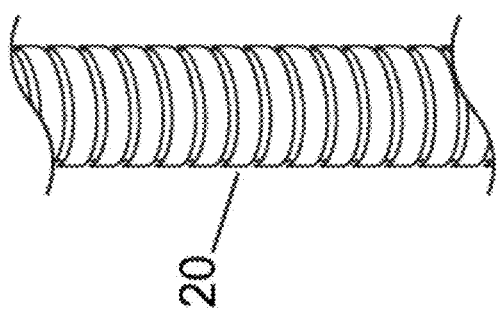
FIG. 6A shows a portion of a metal base hose configured for the hose assembly of FIG. 3.
Figure 7C:
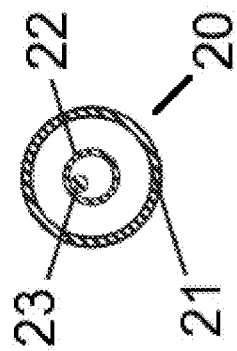
FIG. 7C shows a perpendicular cross-sectional view of the portion of the metal base hose of FIG. 7A.
Figure 7B:
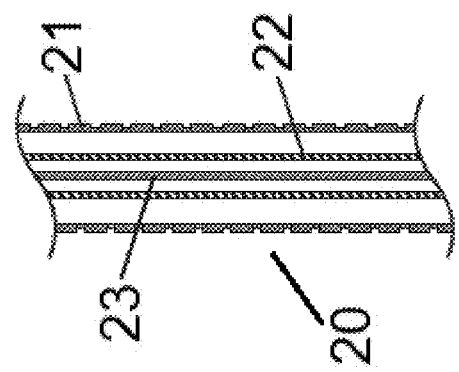
FIG. 7B shows a longitudinal cross-sectional view of the portion of the metal base hose of FIG. 7A.
Figure 7A:
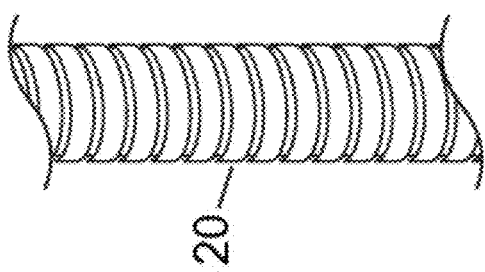
FIG. 7A shows a portion of a metal base hose configured for the hose assembly of FIG. 3.
Figure 8C:
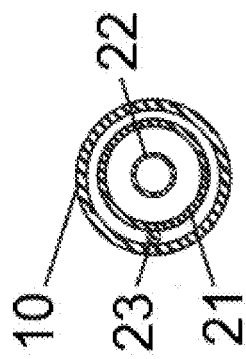
FIG. 8C shows a perpendicular cross-sectional view of the portion of the extruded bendable sleeve and underlying metal base hose of FIG. 8A.
Figure 8B:
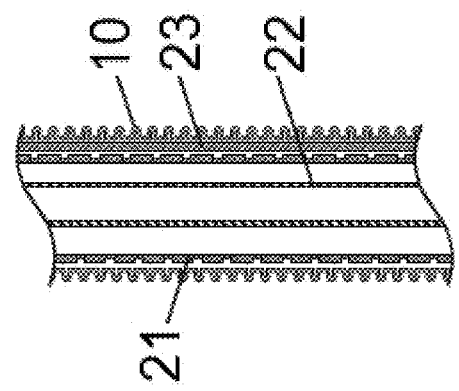
FIG. 8B shows a longitudinal cross-sectional view of the portion of the extruded bendable sleeve and underlying metal base hose of FIG. 8A.
Figure 8A:
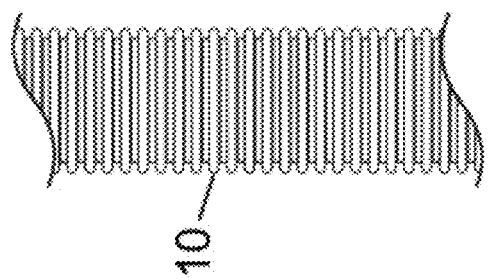
FIG. 8A shows a portion of an extruded bendable sleeve and underlying metal base hose configured for the hose assembly of FIG. 3.
Figure 11A:
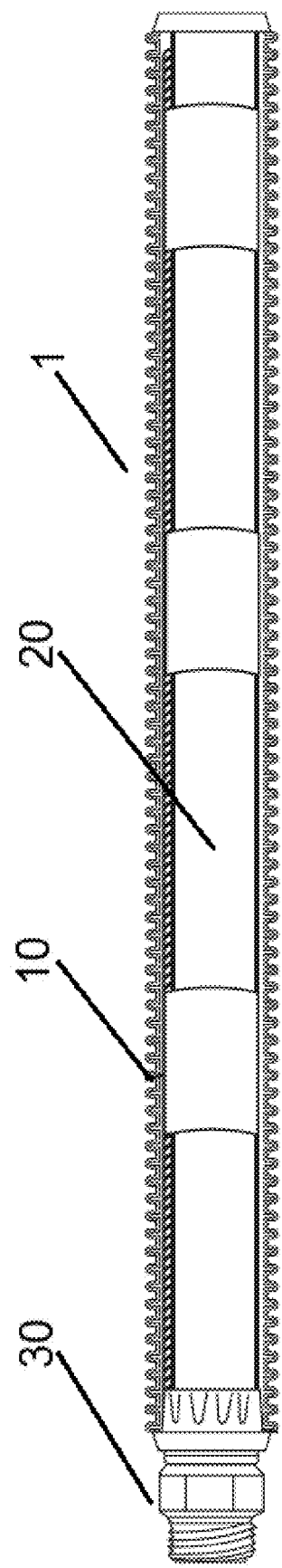
FIG. 11A shows a cut-away view of a portion of the hose assembly of FIG. 9.
Figure 11B:
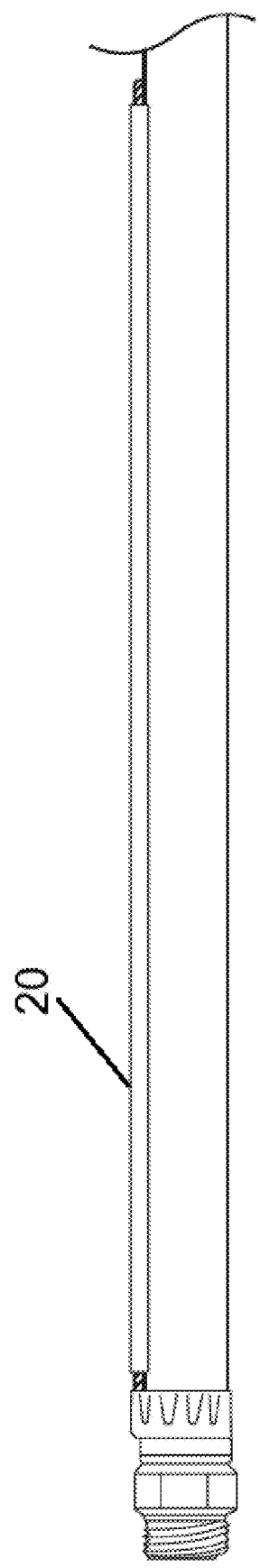
FIG. 11B shows a portion of a rubber base hose configured for the hose assembly of FIG. 9.
Figure 14C:
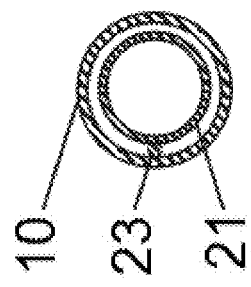
FIG. 14C shows a perpendicular cross-sectional view of the portion of the extruded bendable sleeve and underlying rubber base hose of FIG. 14A.
Figure 14B:
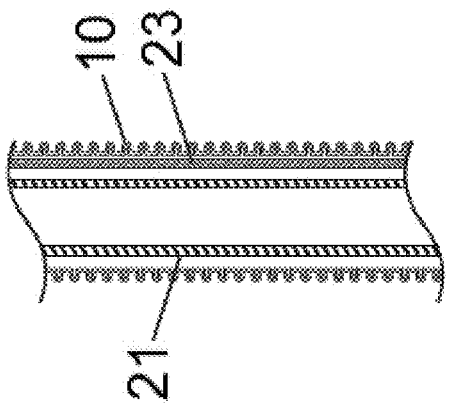
FIG. 14B shows a longitudinal cross-sectional view of the portion of the extruded bendable sleeve and underlying rubber base hose of FIG. 14A.
Figure 14A:
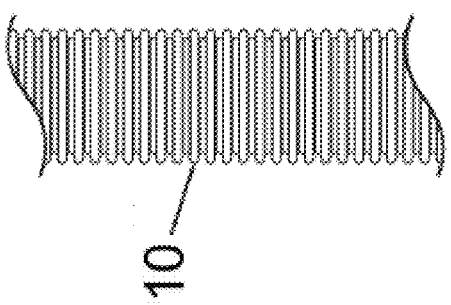
FIG. 14A shows a portion of an extruded bendable sleeve and underlying rubber base hose configured for the hose assembly of FIG. 9.

As in FIGS. 6-7, hose 20 may include outer enclosure 21, inner tube 22, and wire 23. Inner tube 22 may be a plastic tube. Wire 23 may be attached to inner tube 22, such as at an outer surface of inner tube 22 (FIGS. 6B-6C) or an inner surface of inner tube 22 (FIGS. 7B-7C). As in FIGS. 8B-8C, wire 23 may be provided between outer enclosure 21 and sleeve 10. The wire is preferably a bendable wire, and may be attached by capping, crimping, gluing, sewing, and the like. The bendable wire may be any industry-accepted bendable wire including but not limited to a bendable wire in the form of a solid wire, a strand wire, a braided wire, and the like. Additionally, the wire may be secured at the outlet end portion or at an opposite end of the sleeve 10. It is preferable that the wire serves as a friction component and is secured to at least one end of the bendable sleeve or approximately same location on the base hose. The friction component may be secured at or around both ends of the bendable sleeve, but it is preferable to be secured at only one end. Moreover, the wire may be loosely secured to the metal base hose by one or more flexible bands, plastic sheaths, and the like, such as in FIG. 5.

FIGS. 9-14 provide several non-limiting variations of a hose assembly of the present in which the hose assembly includes an extruded bendable sleeve and a rubber base hose. Sleeve 10 may be approximately 24 to 32 inches in length. Rubber base hose 20 may be any industry-accepted rubber-type hose, including traditional rubber/PVC garden hoses. As in FIGS. 12-13, hose 20 may include outer enclosure 21 and wire 23. Wire 23 may be attached to an outer surface of outer enclosure 21 (FIGS. 12B-12C), such as by use of a hose with an extrusion for wire 23, or provided in a central portion of hose 20 (FIGS. 13B-13C), such as by use of a centered washer. As in FIGS. 14B-14C, wire 23 may be provided between outer enclosure 21 and sleeve 10. The wire is preferably a bendable wire, and may be attached by capping, crimping, gluing, sewing, and the like. The bendable wire may be any industry-accepted bendable wire including but not limited to a bendable wire in the form of a solid wire, a strand wire, a braided wire, and the like. Additionally, the wire may be secured at the outlet end portion. Moreover, the wire may be loosely secured to the rubber base hose by one or more flexible bands, plastic sheaths, and the like, or inserted into a co-extruded tube attached to an outer surface of the rubber base hose, such as in FIGS. 11A and 11B, respectively.

Figure 16:
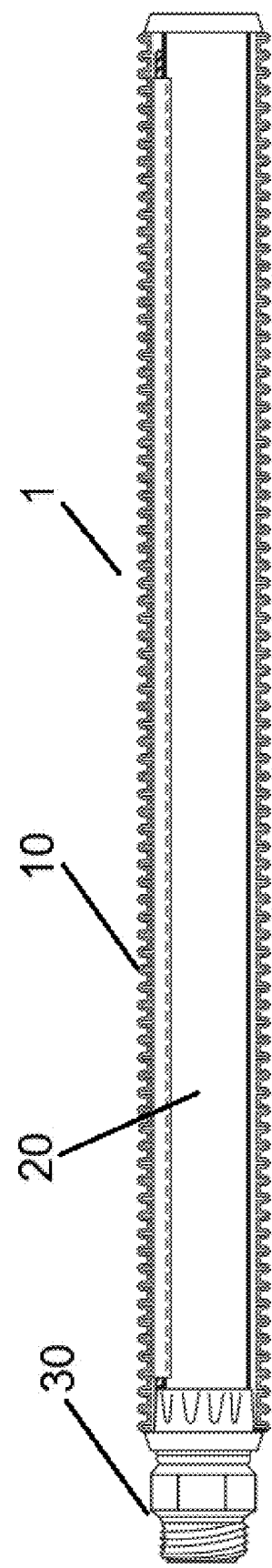
FIG. 16 shows a cut-away view of a portion of the hose assembly of FIG. 15.
Figure 18:
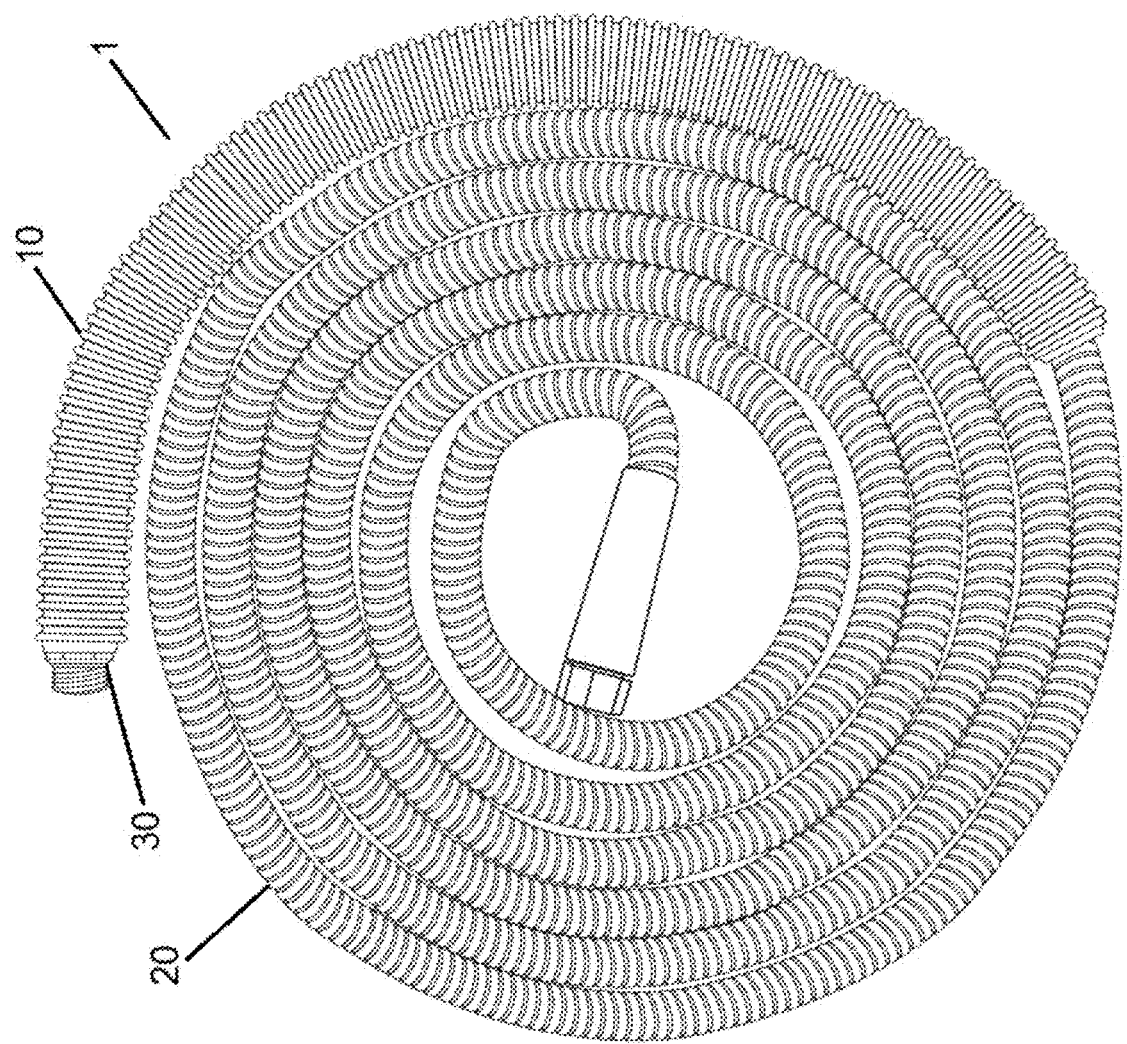
FIG. 18 shows a hose assembly having an adjustable sleeve according to one embodiment of the present invention, in which the hose assembly includes a corrugated metal bendable sleeve and a metal base hose.
Figure 19:
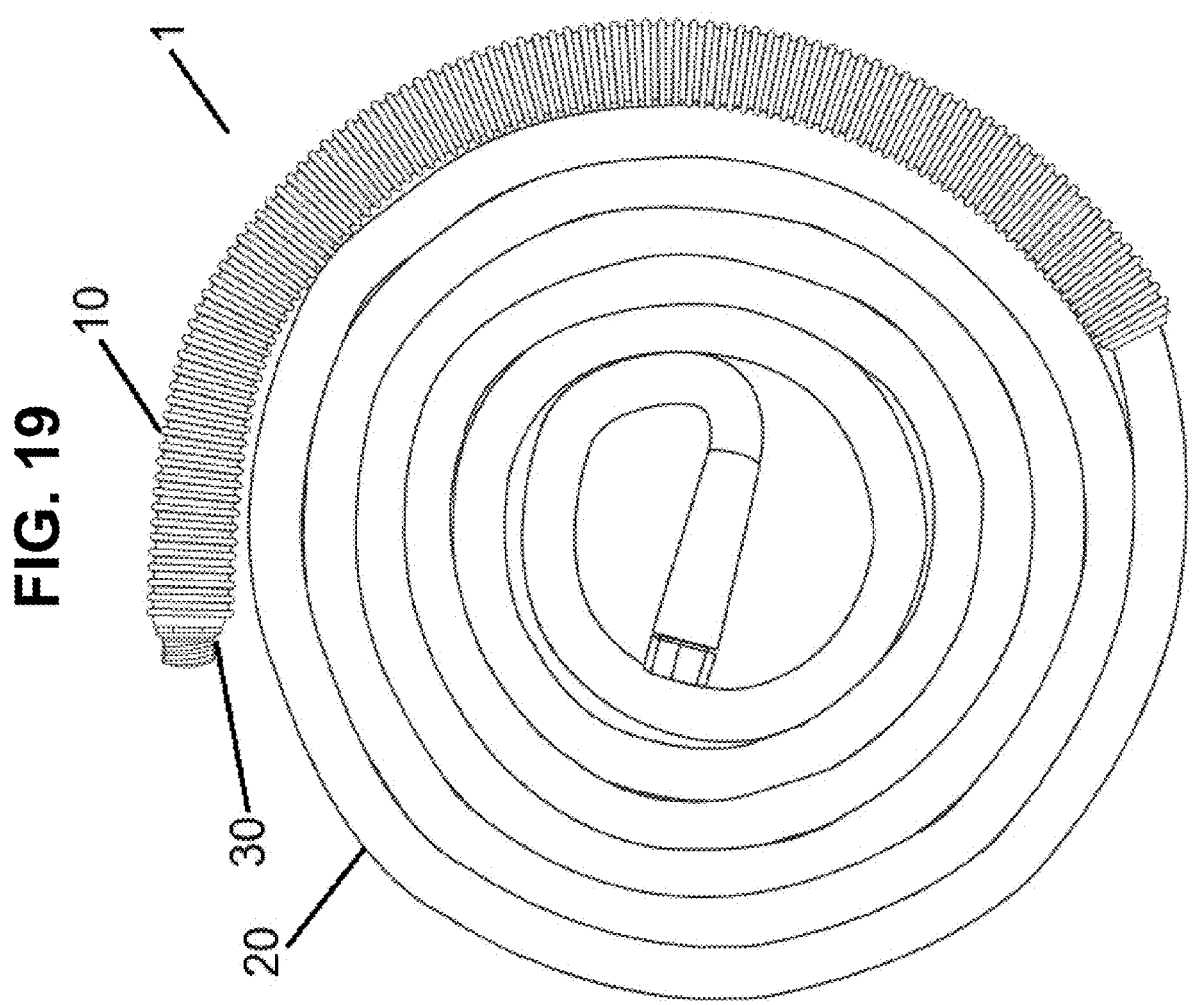
FIG. 19 shows a hose assembly having an adjustable sleeve according to one embodiment of the present invention, in which the hose assembly includes a corrugated metal bendable sleeve and a rubber base hose.

FIGS. 15-17 provide several non-limiting variations of a hose assembly of the present invention, in which the hose assembly includes an extruded bendable sleeve and a fabric-covered expandable base hose. Sleeve 10 may be approximately 24 to 32 inches in length. As in FIG. 17, hose 20 may include outer enclosure 21, inner tube 22, and wire 23. Outer enclosure 21 may be a fabric enclosure. Inner tube 22 may be a plastic tube. Wire 23 may be attached to an outer surface of outer enclosure 21 or otherwise provided between outer enclosure 21 and sleeve 10. The wire is preferably a bendable wire, and may be attached by capping, crimping, gluing, sewing, and the like. The bendable wire may be any industry-accepted bendable wire including but not limited to a bendable wire in the form of a solid wire, a strand wire, a braided wire, and the like. Additionally, the wire may be secured at the outlet end portion. Moreover, the wire may be inserted into a sewn sleeve attached to an outer surface of the fabric-covered expandable base hose, such as in FIG. 16.

Figure 20:
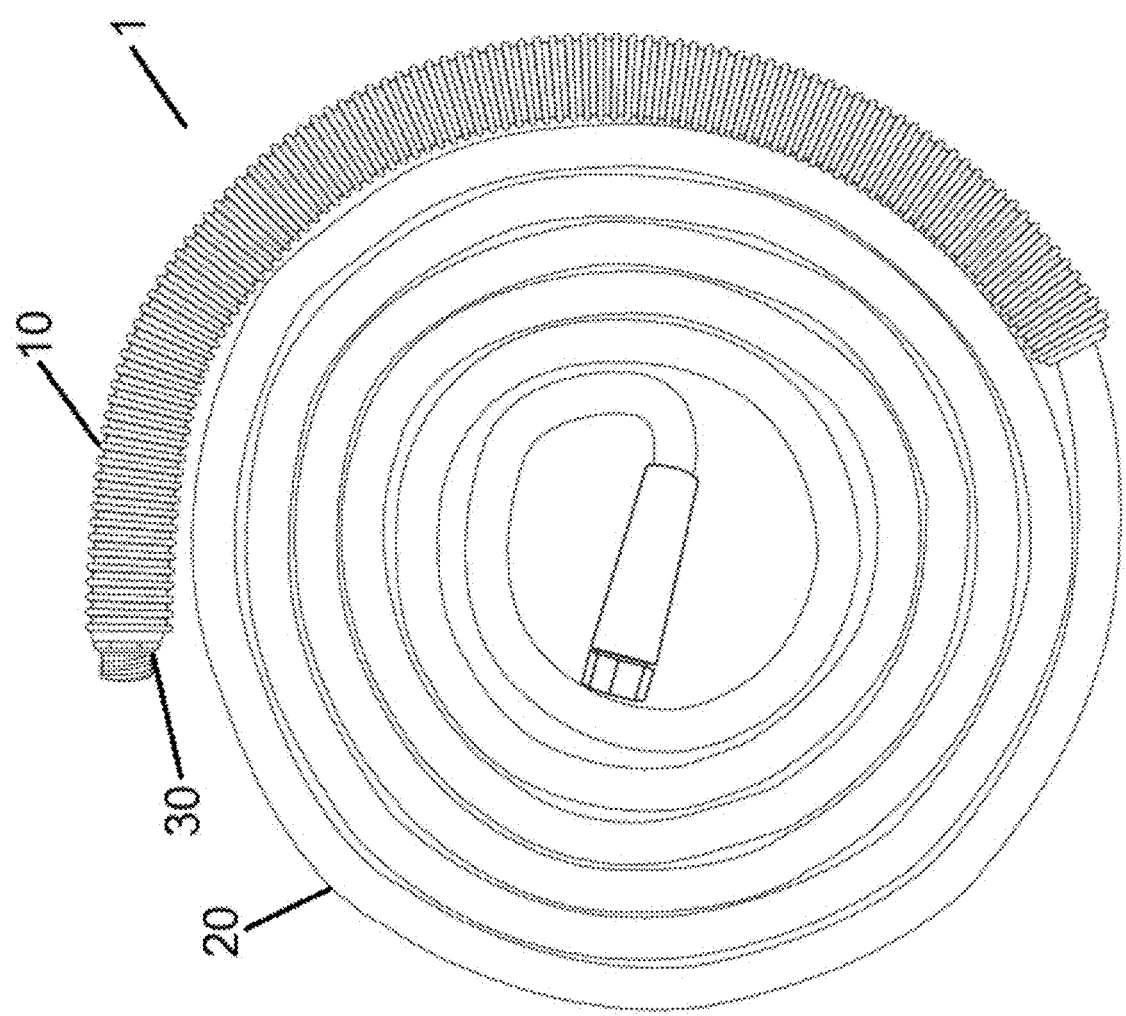
FIG. 20 shows a hose assembly having an adjustable sleeve according to one embodiment of the present invention, in which the hose assembly includes a corrugated metal bendable sleeve and a fabric-covered expandable base hose.
Figure 24:
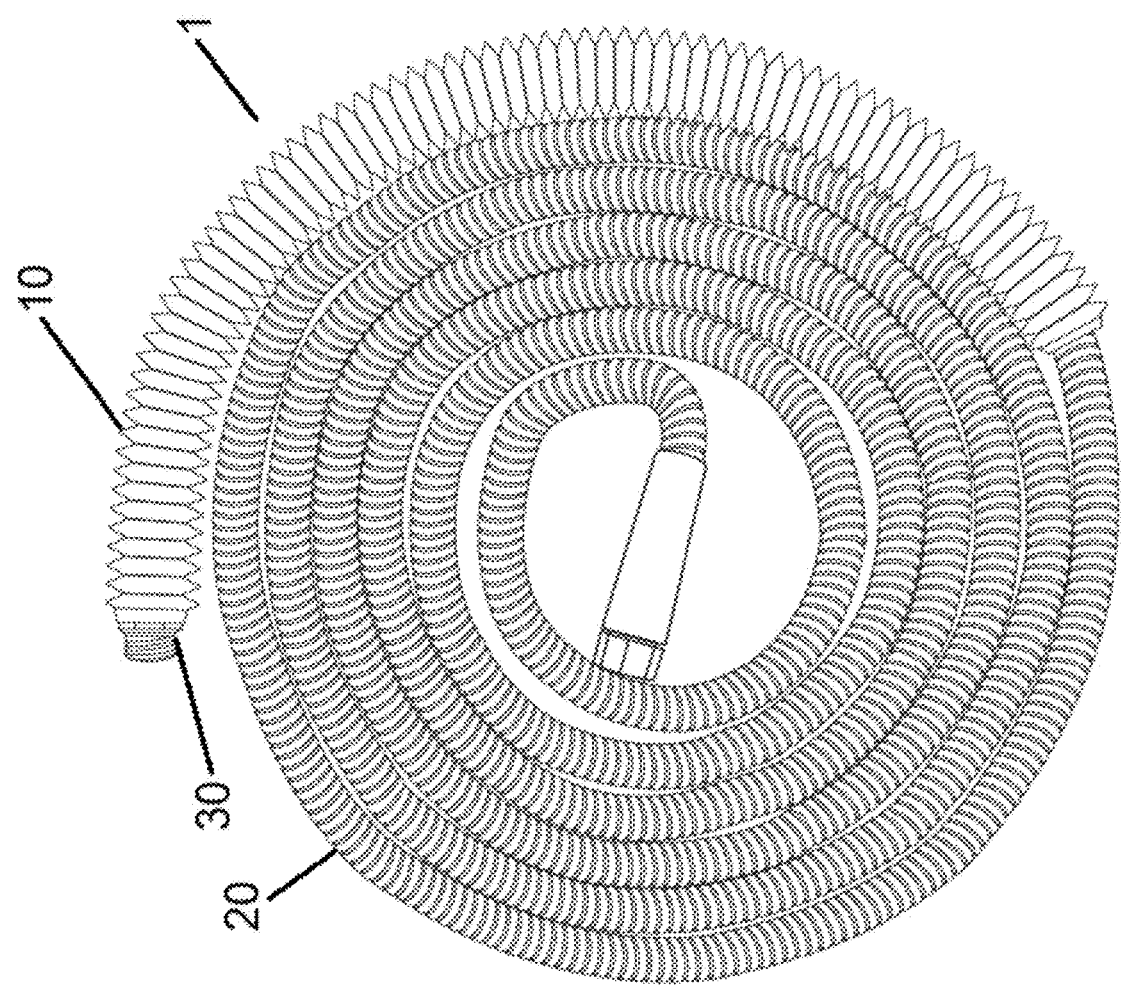
FIG. 24 shows a hose assembly having an adjustable sleeve according to one embodiment of the present invention, in which the hose assembly includes an accordion plastic bendable sleeve and a metal base hose.
Figure 25:
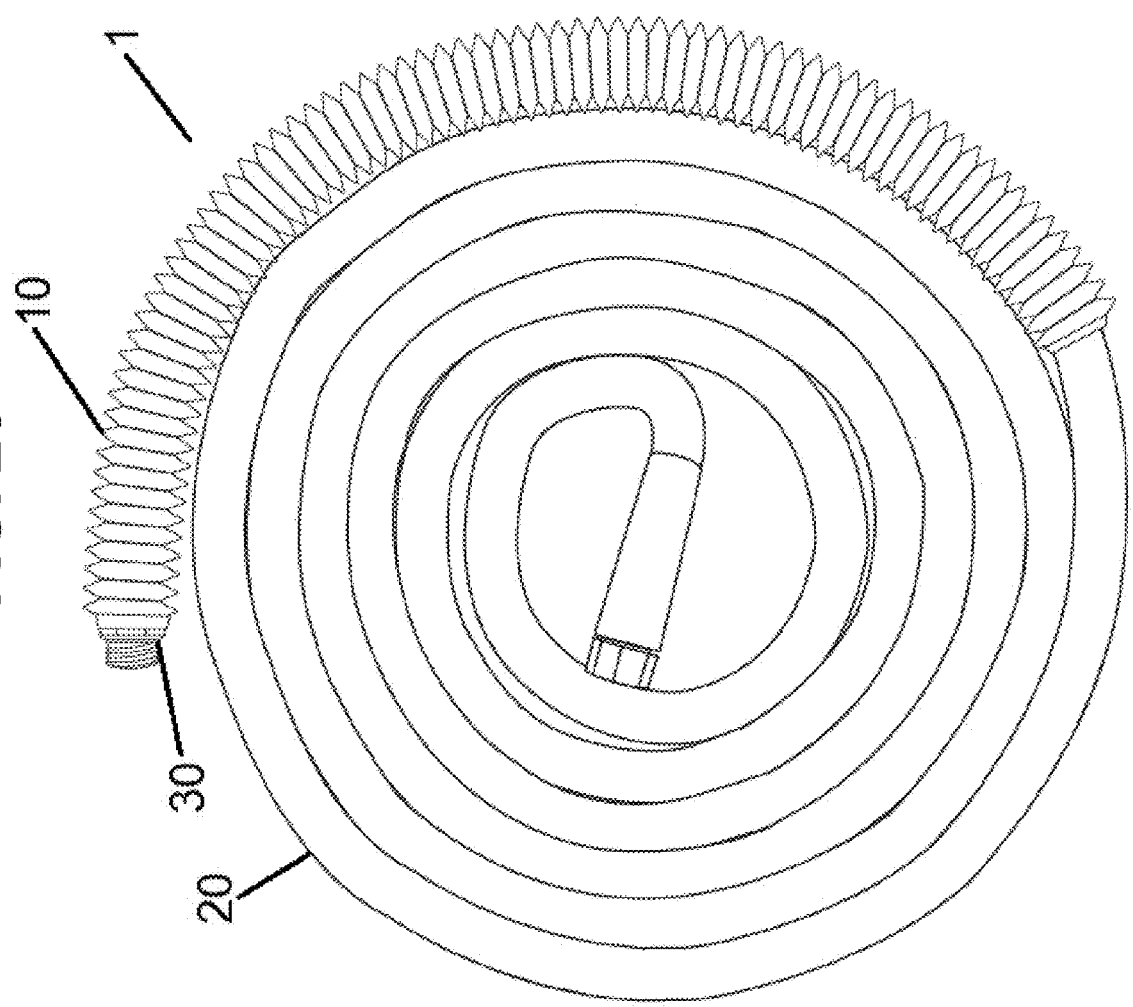
FIG. 25 shows a hose assembly having an adjustable sleeve according to one embodiment of the present invention, in which the hose assembly includes an accordion plastic bendable sleeve and a rubber base hose.
Figure 30:
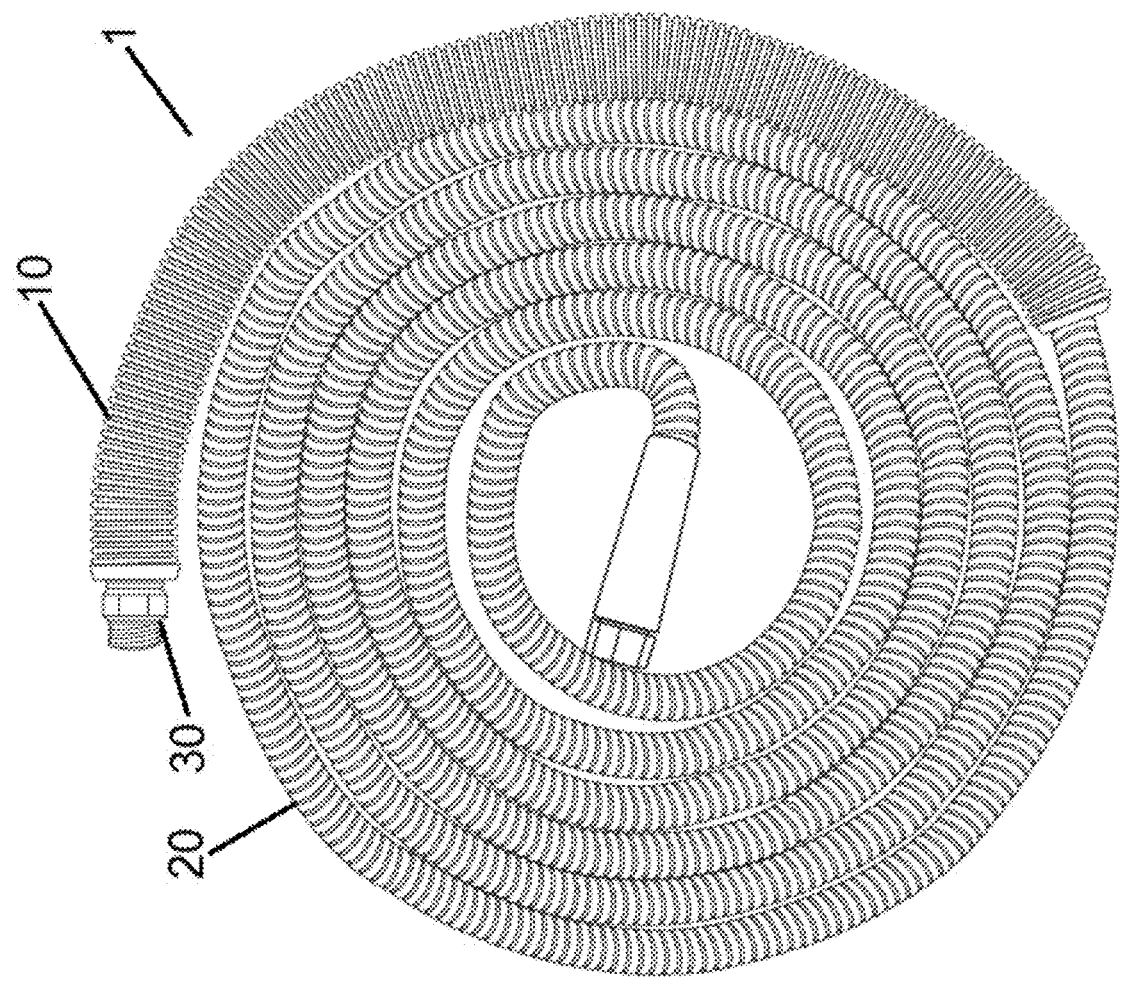
FIG. 30 shows a hose assembly having an adjustable sleeve according to one embodiment of the present invention, in which the hose assembly includes an extruded plastic bendable sleeve, an underlying metal coil, and a metal base hose.
Figure 31:
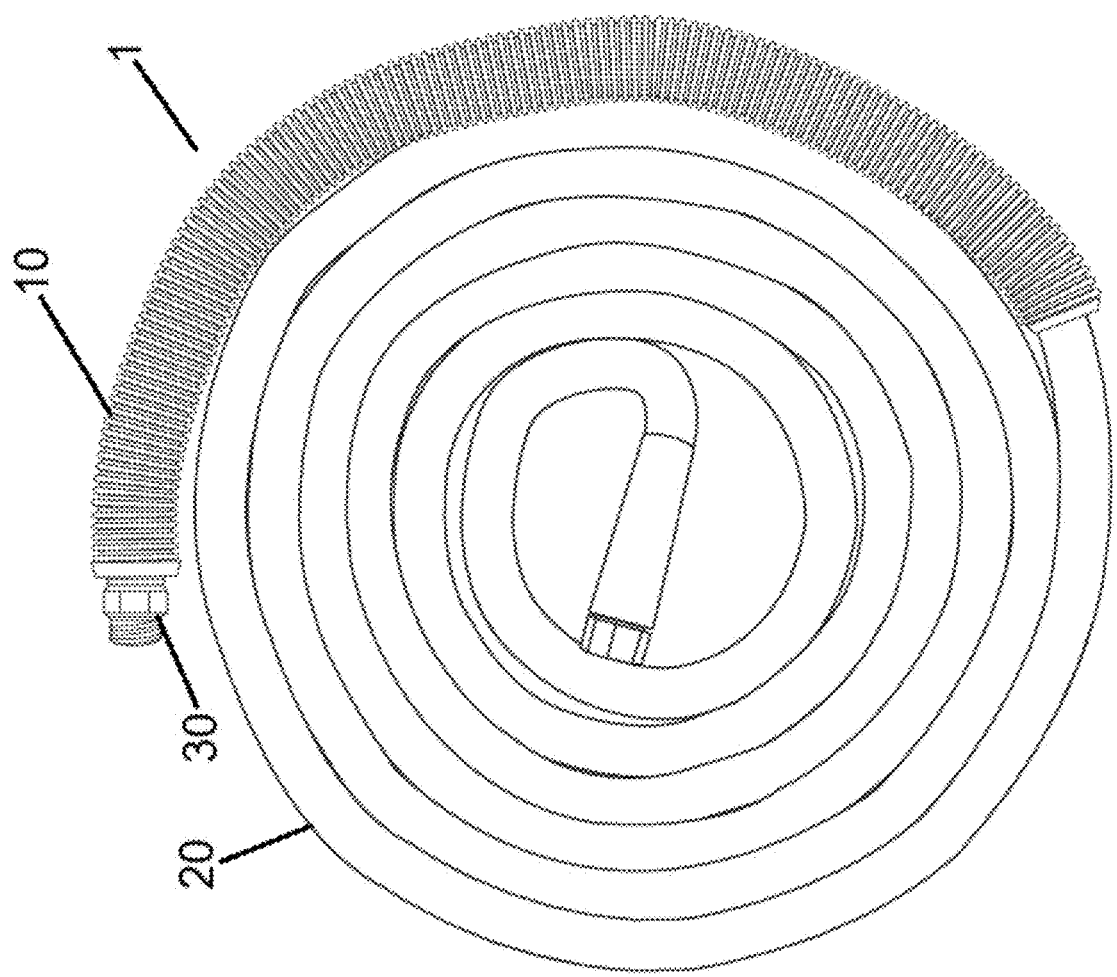
FIG. 31 shows a hose assembly having an adjustable sleeve according to one embodiment of the present invention, in which the hose assembly includes an extruded plastic bendable sleeve, an underlying metal coil, and a rubber base hose.

FIGS. 18-23 provide several non-limiting variations of a hose assembly of the present invention, in which the hose assembly includes a corrugated metal bendable sleeve and a metal base hose (FIGS. 18 and 21), a rubber base hose (FIGS. 19 and 22), or a fabric-covered expandable base hose (FIGS. 20 and 23). Sleeve 10 may be approximately 24 to 32 inches in length. Sleeve 10 may be attached by capping, crimping, gluing, sewing, and the like. Additionally, sleeve 10 may be secured at the outlet end portion.

FIGS. 24-29 provide several non-limiting variations of a hose assembly of the present invention, in which the hose assembly includes an accordion plastic bendable sleeve and a metal base hose (FIGS. 24 and 27), a rubber base hose (FIGS. 25 and 28), or a fabric-covered expandable base hose (FIGS. 26 and 29). Sleeve 10 may be approximately 24 to 32 inches in length. Sleeve 10 may be attached by capping, crimping, gluing, sewing, and the like. Additionally, sleeve 10 may be secured at the outlet end portion.

Figure 32:
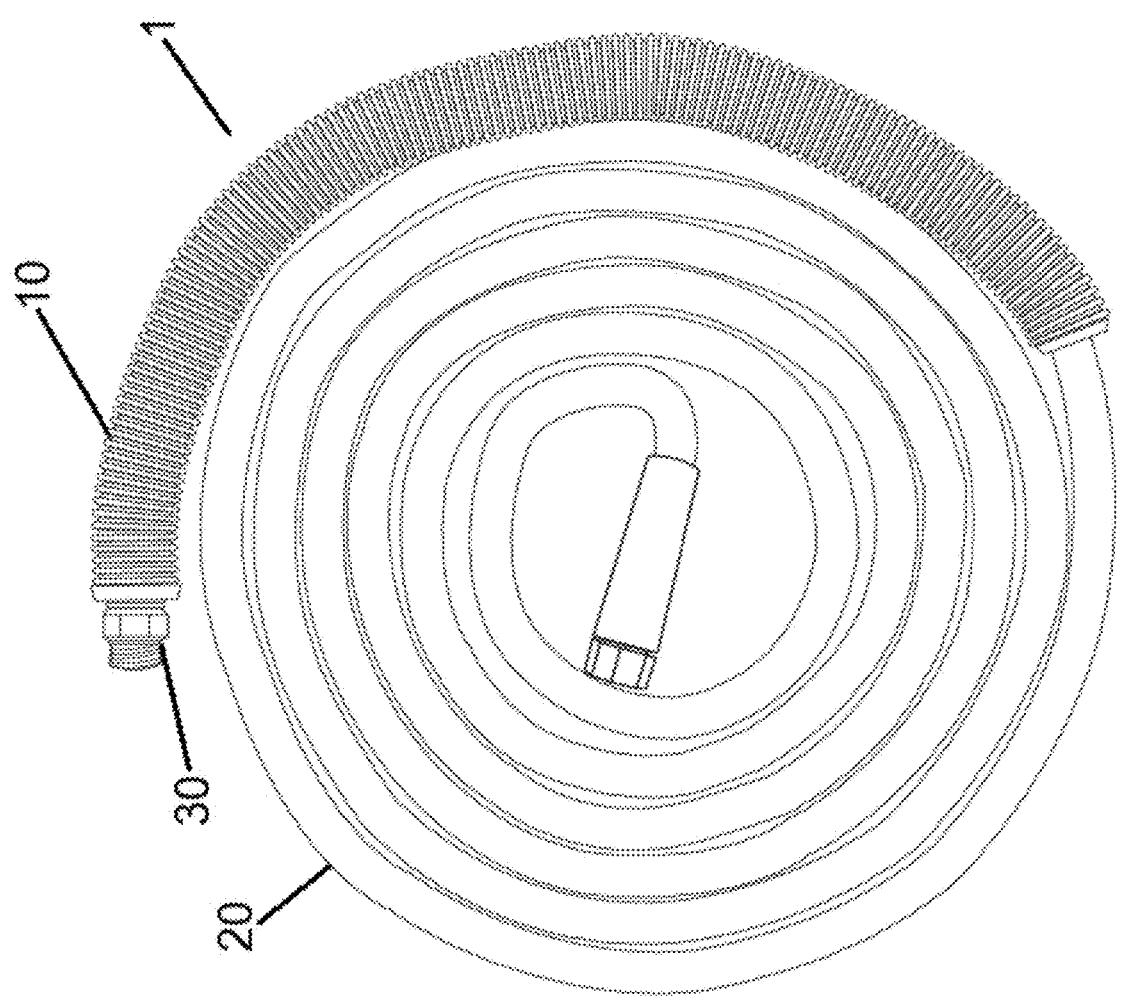
FIG. 32 shows a hose assembly having an adjustable sleeve according to one embodiment of the present invention, in which the hose assembly includes an extruded plastic bendable sleeve, an underlying metal coil, and a fabric-covered expandable base hose.
Figure 33:
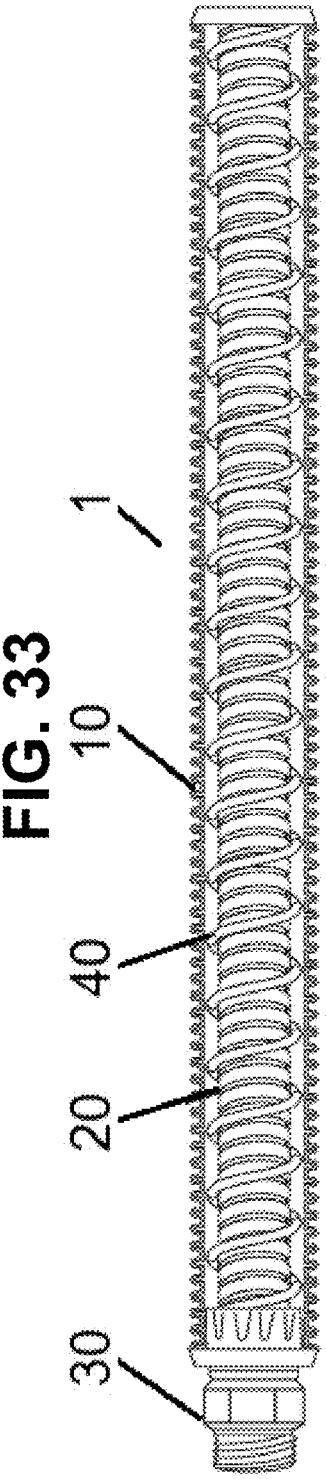
FIG. 33 shows a cut-away view of a portion of a hose assembly having an adjustable sleeve according to one embodiment of the present invention, in which the hose assembly includes an extruded plastic bendable sleeve, an underlying metal coil, and a metal base hose.
Figure 34:
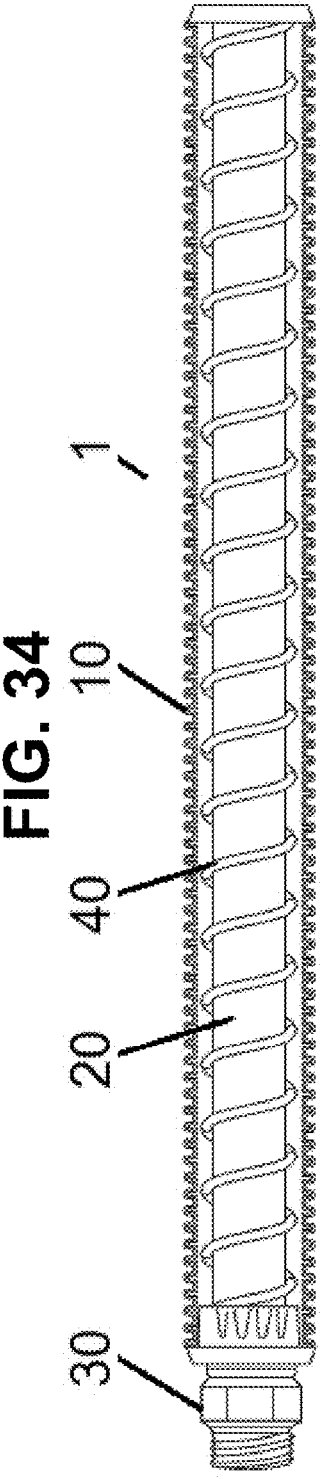
FIG. 34 shows a cut-away view of a portion of a hose assembly having an adjustable sleeve according to one embodiment of the present invention, in which the hose assembly includes an extruded plastic bendable sleeve, an underlying metal coil, and a rubber base hose.
Figure 35:
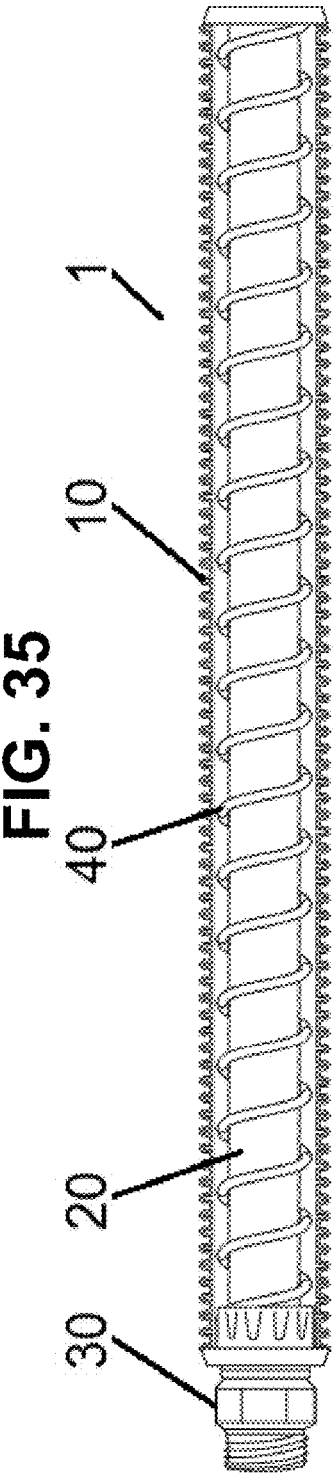
FIG. 35 shows a cut-away view of a portion of a hose assembly having an adjustable sleeve according to one embodiment of the present invention, in which the hose assembly includes an extruded plastic bendable sleeve, an underlying metal coil, and a fabric-covered expandable base hose.
Figure 36:
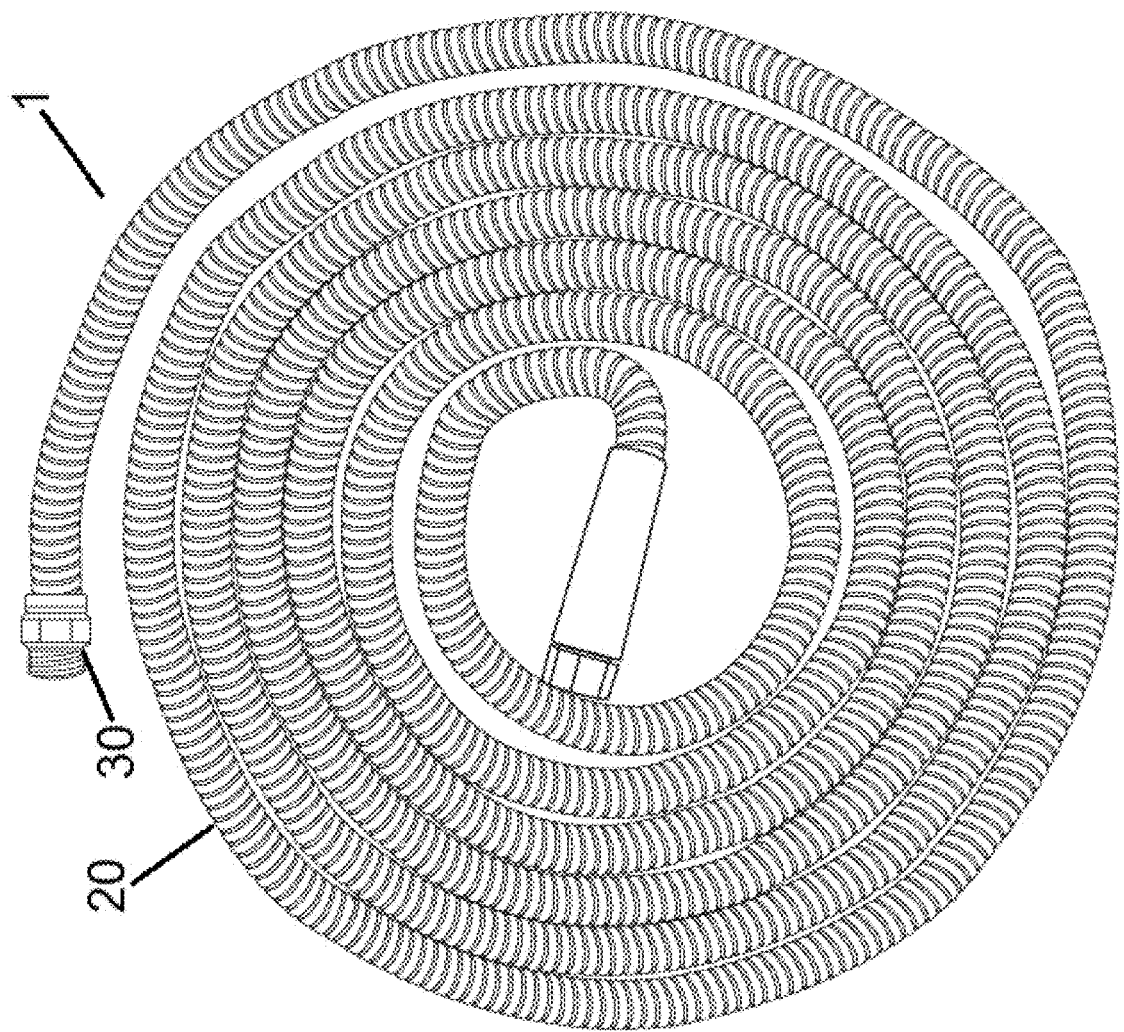
FIG. 36 shows a hose assembly having an adjustable sleeve according to one embodiment of the present invention, in which the hose assembly includes an inner articulating plastic bendable sleeve and a metal base hose.
Figure 37:
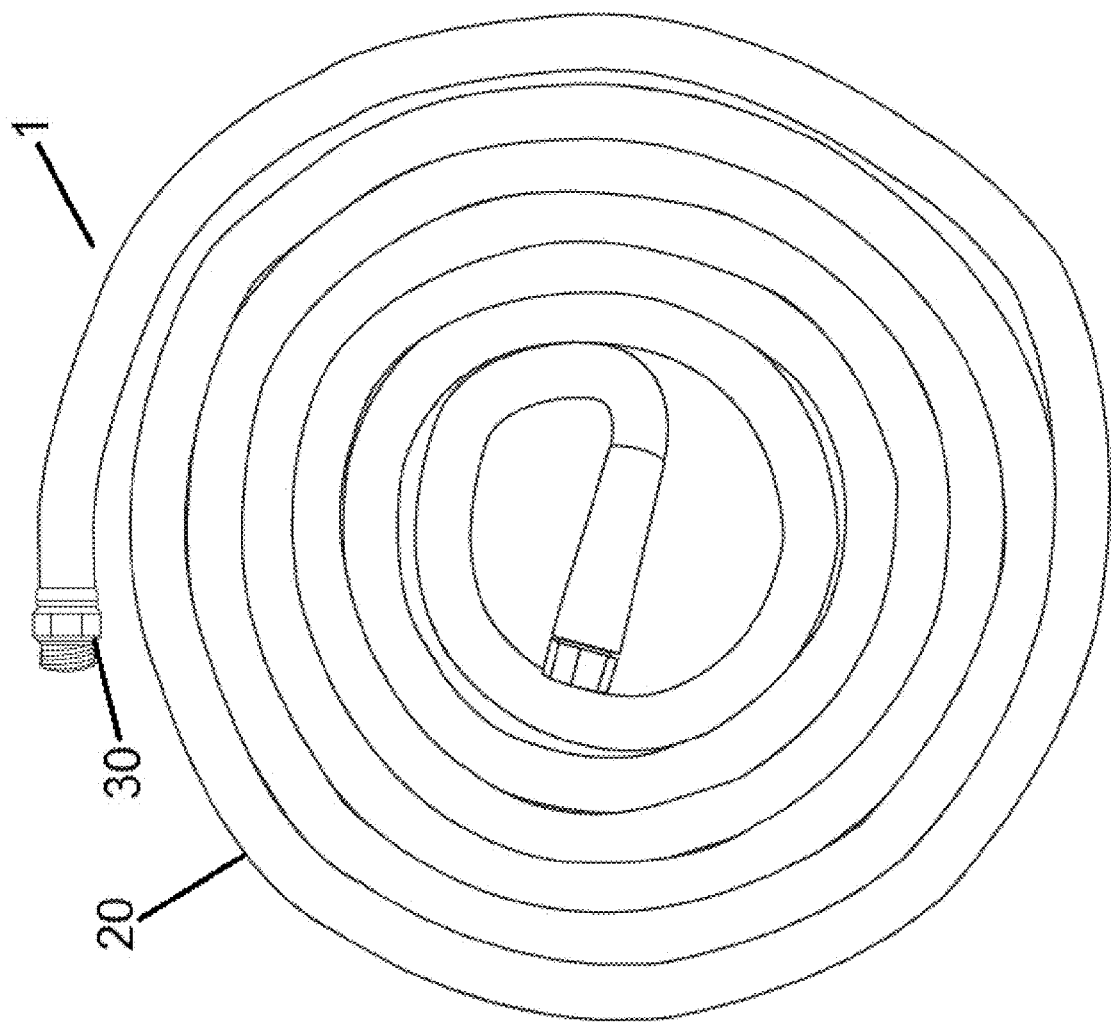
FIG. 37 shows a hose assembly having an adjustable sleeve according to one embodiment of the present invention, in which the hose assembly includes an inner articulating plastic bendable sleeve and a rubber base hose.

FIGS. 30-35 provide several non-limiting variations of a hose assembly of the present invention, in which the hose assembly includes an extruded plastic bendable sleeve, an underlying metal coil, and a metal base hose (FIGS. 30 and 33), a rubber base hose (FIGS. 31 and 34), or a fabric-covered expandable base hose (FIGS. 32 and 35). Metal coil 40 may be attached or otherwise contact an outer surface of hose 20. The metal coil is preferably a bendable metal coil, and may be attached by capping, crimping, gluing, sewing, and the like. Additionally, the metal coil may be secured at the outlet end portion.

Figure 38:
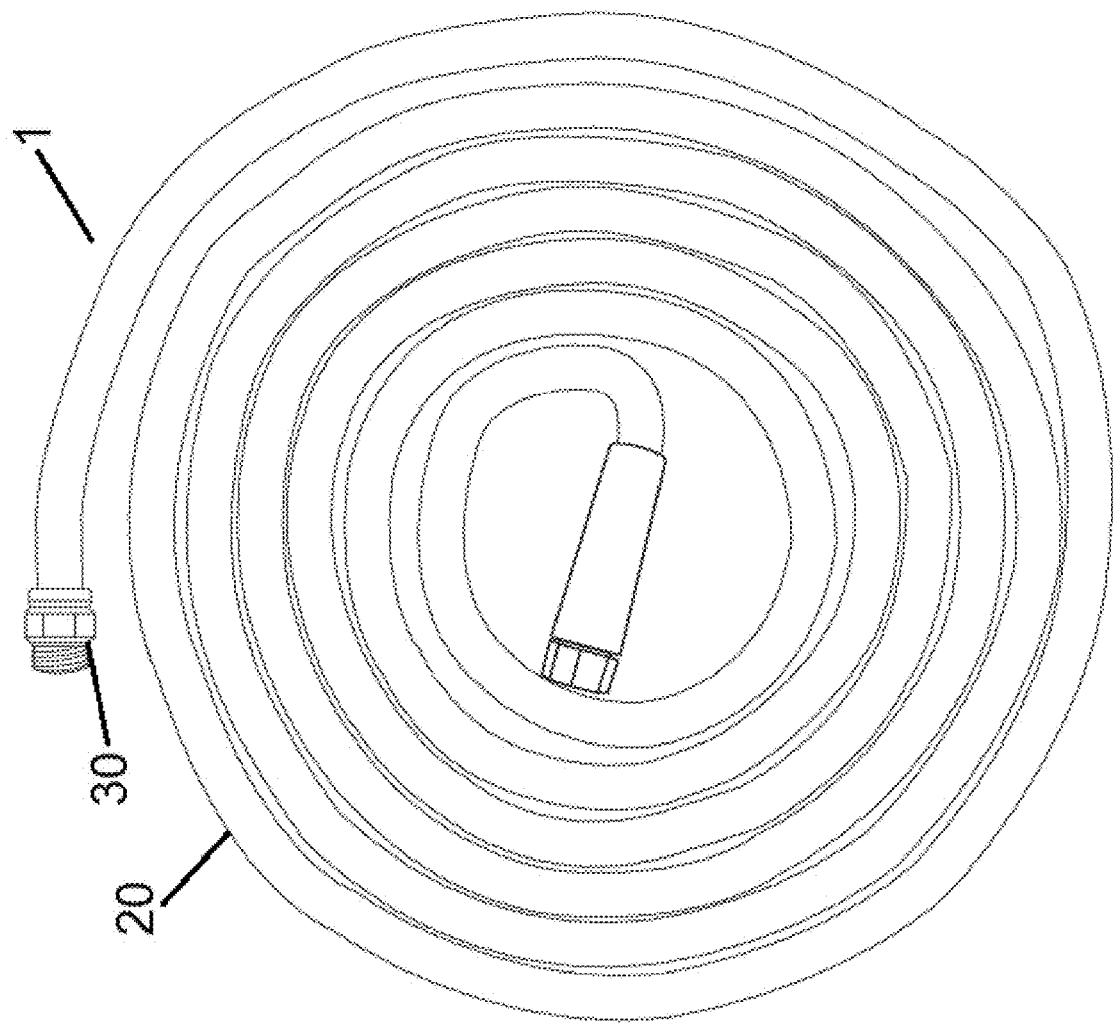
FIG. 38 shows a hose assembly having an adjustable sleeve according to one embodiment of the present invention, in which the hose assembly includes an inner articulating plastic bendable sleeve and a fabric-covered expandable base hose.
Figure 39:
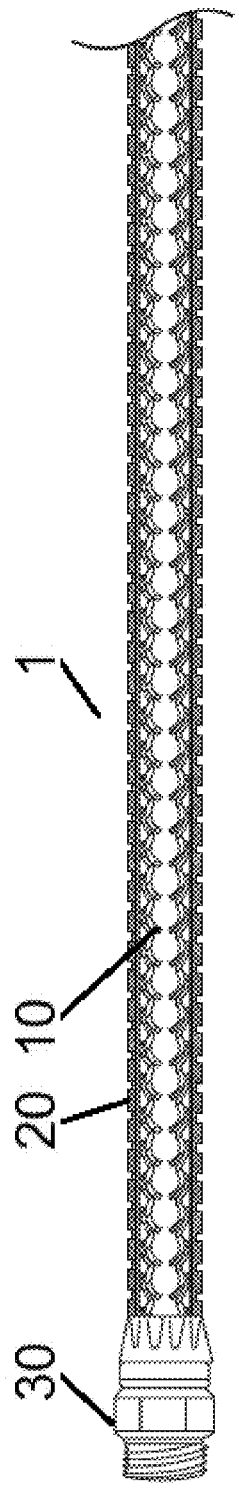
FIG. 39 shows a longitudinal cross-sectional view of a portion of a hose assembly having an adjustable sleeve according to one embodiment of the present invention, in which the hose assembly includes an inner articulating plastic bendable sleeve and a metal base hose.
Figure 40:
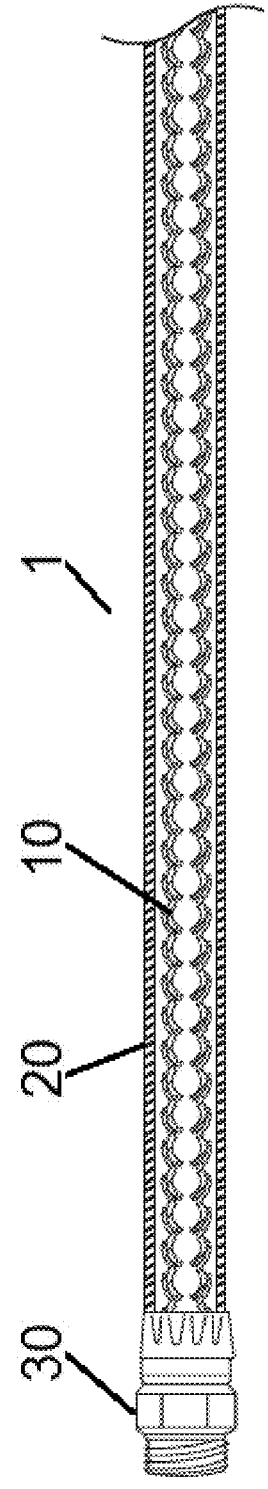
FIG. 40 shows a longitudinal cross-sectional view of a portion of a hose assembly having an adjustable sleeve according to one embodiment of the present invention, in which the hose assembly includes an inner articulating plastic bendable sleeve and a rubber base hose.
Figure 41:
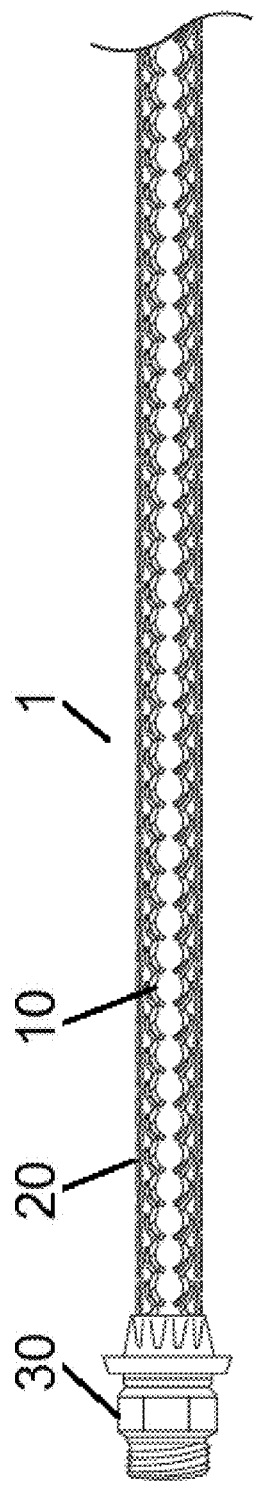
FIG. 41 shows a longitudinal cross-sectional view of a portion of a hose assembly having an adjustable sleeve according to one embodiment of the present invention, in which the hose assembly includes an inner articulating plastic bendable sleeve and a fabric-covered expandable base hose.
Figure 42:
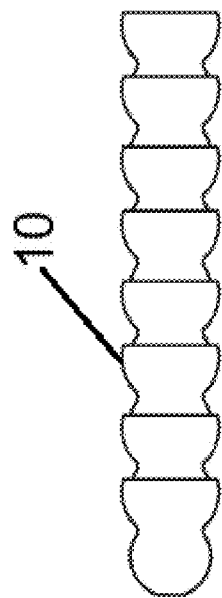
FIG. 42 shows an inner articulating plastic bendable sleeve configured for a hose assembly of the present invention.
Figure 43:
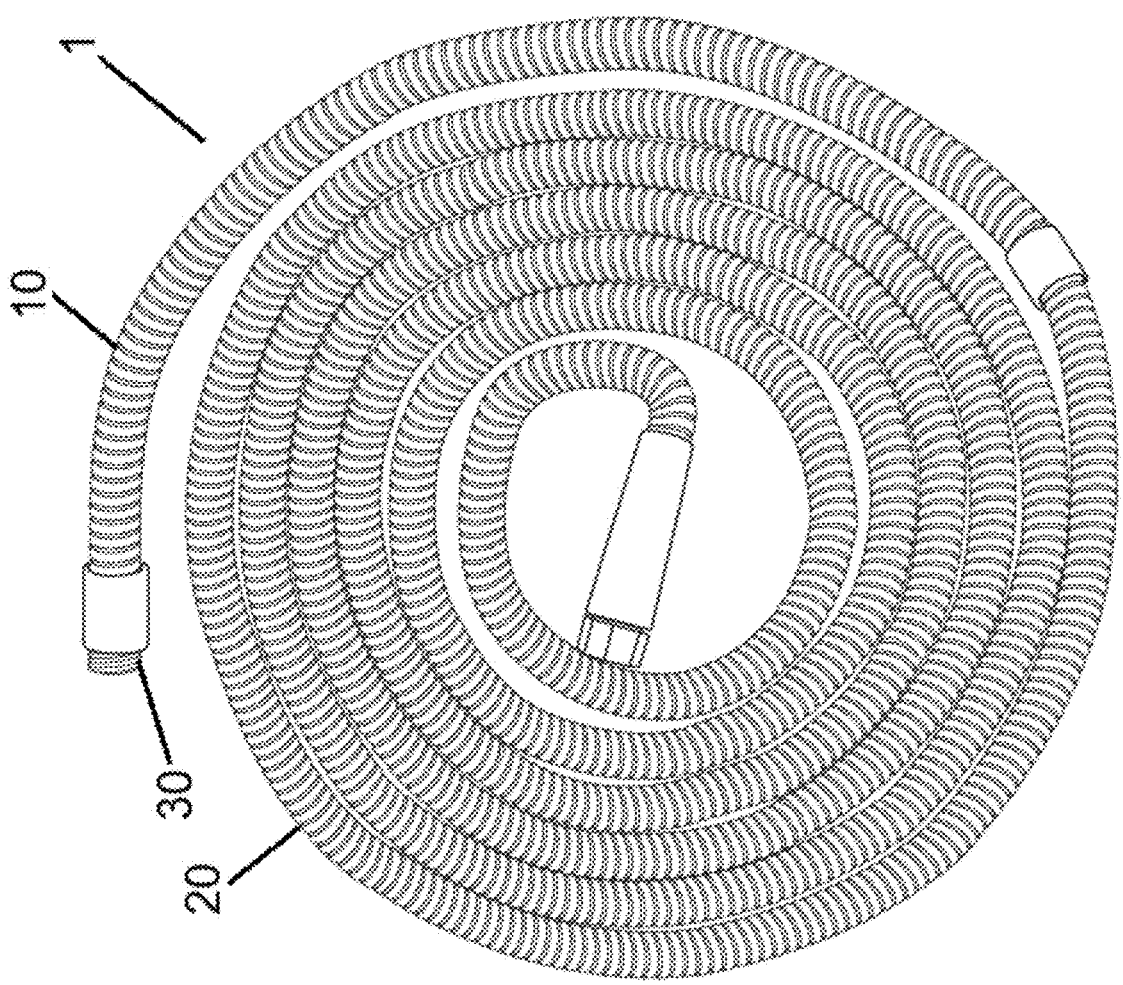
FIG. 43 shows a hose assembly having an adjustable sleeve according to one embodiment of the present invention, in which the hose assembly includes a metal gooseneck bendable sleeve and a metal base hose.
Figure 44:
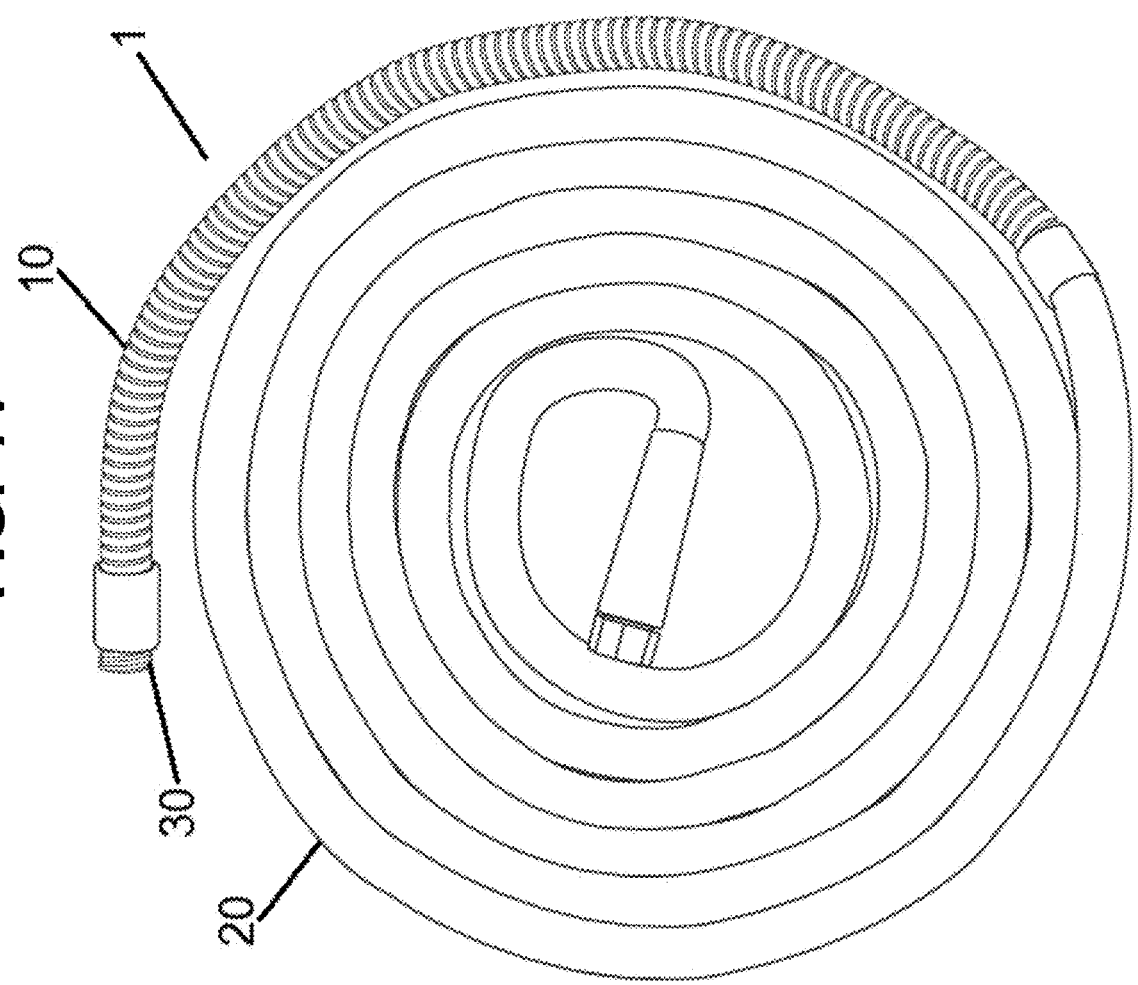
FIG. 44 shows a hose assembly having an adjustable sleeve according to one embodiment of the present invention, in which the hose assembly includes a metal gooseneck bendable sleeve and a rubber base hose.

FIGS. 36-41 provide several non-limiting variations of a hose assembly of the present invention, in which the hose assembly includes an inner articulating plastic bendable sleeve and a metal base hose (FIGS. 36 and 39), a rubber base hose (FIGS. 37 and 40), or a fabric-covered expandable base hose (FIGS. 38 and 41). Sleeve 10 may be an inner articulating plastic bendable sleeve, such as in FIG. 42, attached by capping, crimping, gluing, sewing, and the like. Additionally, sleeve 10 may be secured at the outlet end portion.

Figure 45:
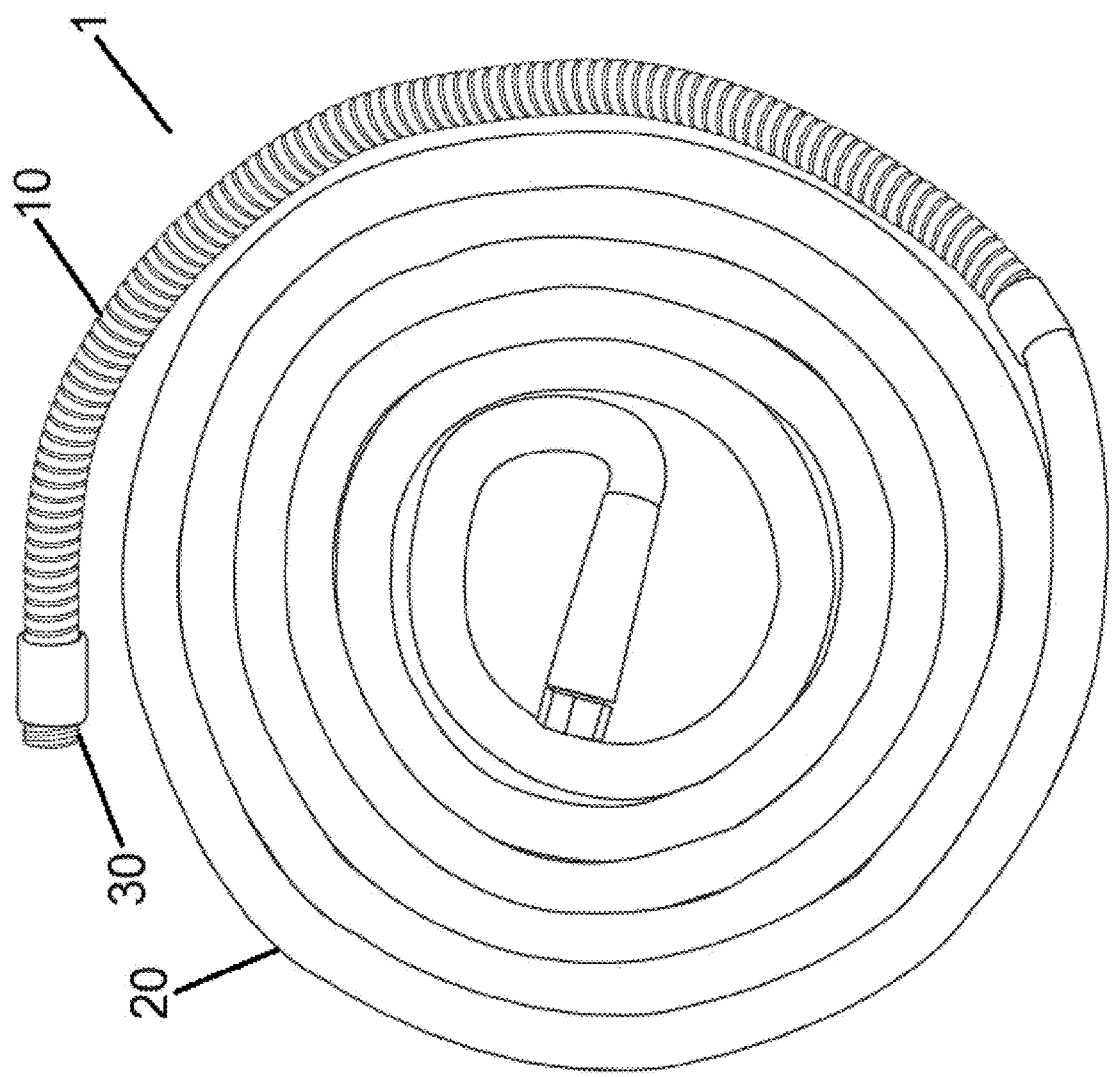
FIG. 45 shows a hose assembly having an adjustable sleeve according to one embodiment of the present invention, in which the hose assembly includes a metal gooseneck bendable sleeve and a fabric-covered expandable base hose.
Figure 46:
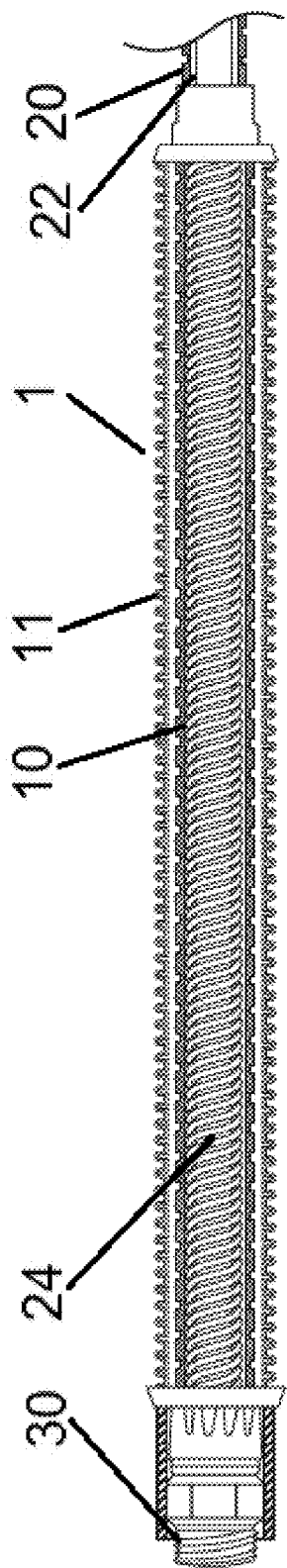
FIG. 46 shows a cut-away view of a portion of a hose assembly having an adjustable sleeve according to one embodiment of the present invention, in which the hose assembly includes a metal gooseneck bendable sleeve and a metal base hose.
Figure 47:
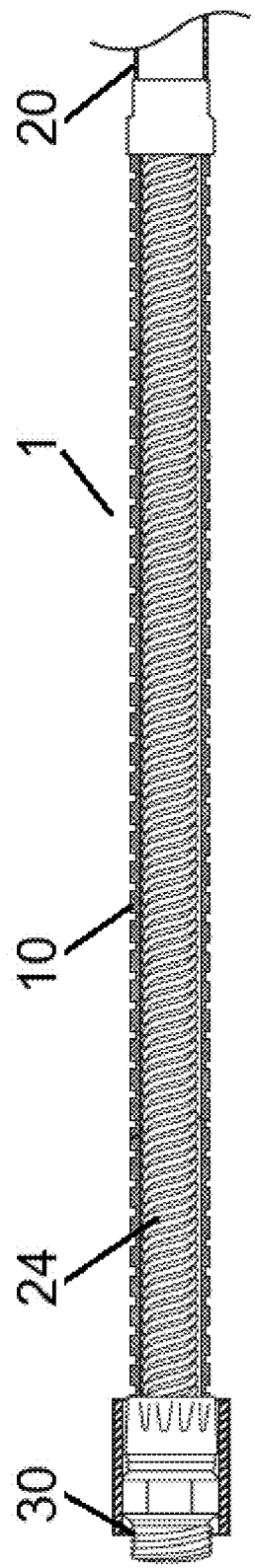
FIG. 47 shows a cut-away view of a portion of a hose assembly having an adjustable sleeve according to one embodiment of the present invention, in which the hose assembly includes a metal gooseneck bendable sleeve and a rubber base hose.
Figure 48:
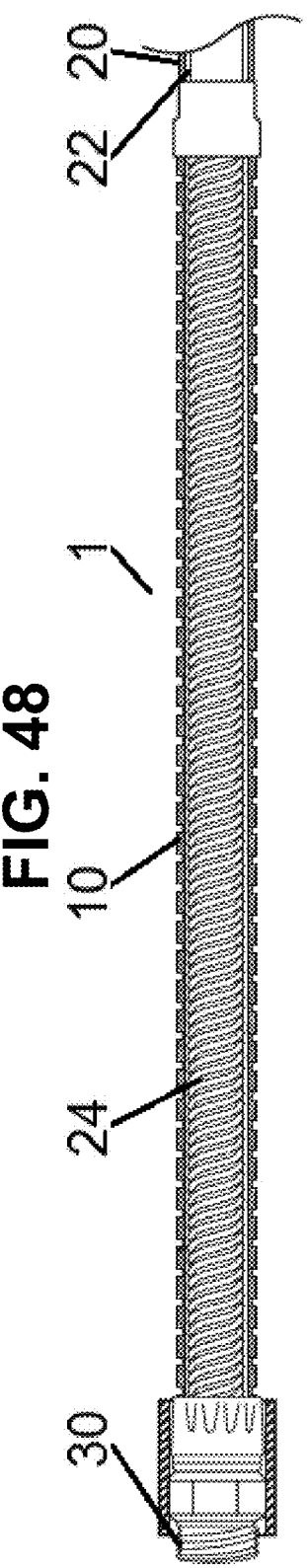
FIG. 48 shows a cut-away view of a portion of a hose assembly having an adjustable sleeve according to one embodiment of the present invention, in which the hose assembly includes a metal gooseneck bendable sleeve and a fabric-covered expandable base hose.

FIGS. 43-48 provide several non-limiting variations of a hose assembly of the present invention, in which the hose assembly includes a metal gooseneck bendable sleeve and a metal base hose (FIGS. 43 and 46), a rubber base hose (FIGS. 44 and 47), or a fabric-covered expandable base hose (FIGS. 45 and 48). Inner coil 24 may be provided in hose 20. Cover 11 may be provided over sleeve 10. Cover 11 may be blow-molded plastic. Sleeve 10 may be approximately 24 to 32 inches in length. Sleeve 10 may be permanently attached by capping, crimping, gluing, sewing, threading, and the like. Additionally, sleeve 10 may be secured at the outlet end portion.

FIGS. 49-54 provide several non-limiting variations of a hose assembly of the present invention, in which the hose assembly includes a plastic spine bendable sleeve, an underlying metal wire insert, and a metal base hose (FIGS. 49 and 52), a rubber base hose (FIGS. 50 and 53), or a fabric-covered expandable base hose (FIGS. 51 and 54). Metal wire insert 12 may be provided between an outer surface of hose 20 and sleeve 10. Sleeve 10 with insert 12 may be approximately 24 to 32 inches in length. Sleeve 10 with insert 12 may be attached by capping, crimping, gluing, sewing, and the like. Additionally, sleeve 10 with insert 12 may be secured at the outlet end portion.

FIGS. 55-59 provide several non-limiting variations of a hose assembly of the present invention, in which the hose assembly includes an extruded bendable sleeve, an underlying metal wire insert, and a metal base hose. Sleeve 10 may be approximately 24 to 32 inches in length. In this embodiment, sleeve 10 is an extruded bendable sleeve; however, sleeve 10 may also be a blow-molded sleeve, an injection-molded sleeve, a rotational-molded sleeve, and the like.

Figure 59:
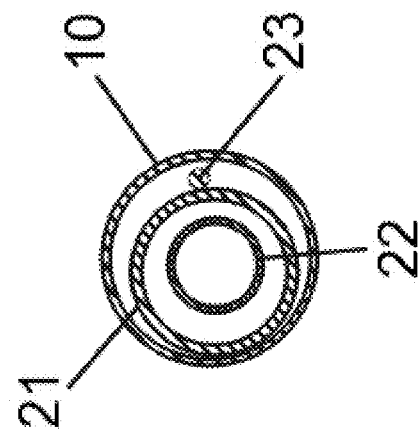
FIG. 59 shows a perpendicular cross-sectional view of a portion of the hose assembly of FIG. 55.
Figure 60:
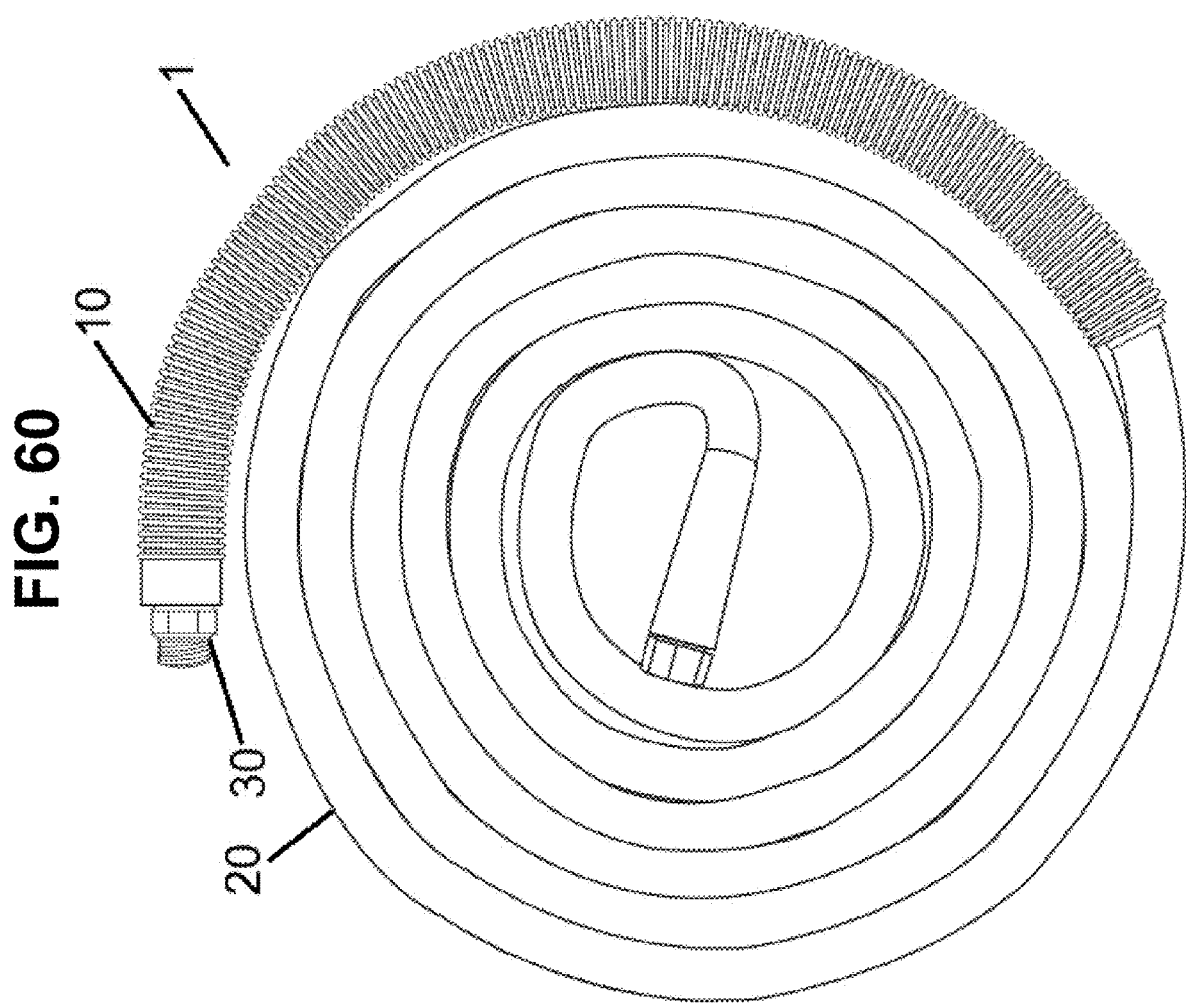
FIG. 60 shows a hose assembly having an adjustable sleeve according to one embodiment of the present invention, in which the hose assembly includes an extruded bendable sleeve, an underlying metal wire insert, and a fabric-covered expandable base hose.
Figure 61:
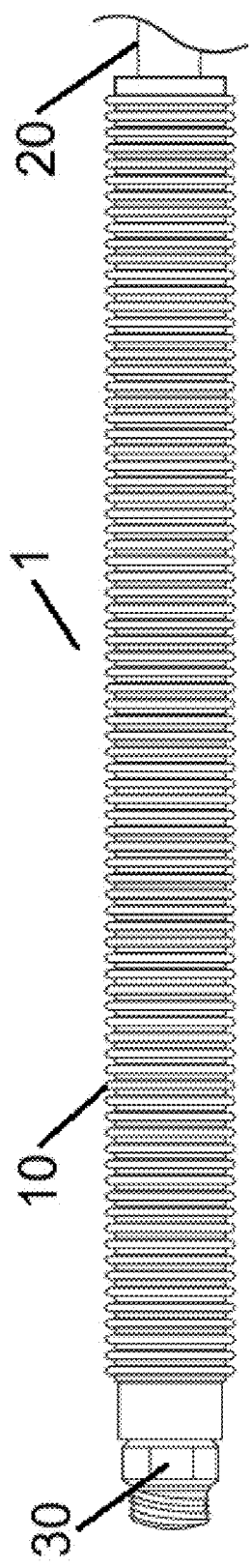
FIG. 61 shows a portion of the hose assembly of FIG. 60.

As in FIGS. 57-59, hose 20 may include outer enclosure 21, inner tube 22, and wire 23. Inner tube 22 may be a plastic tube, such as polyvinyl chloride (PVC). As in FIGS. 57-59, wire 23 may be provided between outer enclosure 21 and sleeve 10. The wire is preferably a bendable solid wire, such as a solid wire made of aluminum (3.0 mm). Connector or coupler 30 may include a crimped metal collar for securing wire 23, in which wire 23 is hooked onto a portion of connector or coupler 30. This arrangement prevents wire 23 from slipping out of position during use. While wire 23 is attached to connector or coupler 30 by a crimping mechanism, any known attachment mechanism may be utilized, including but not limited to capping, gluing, sewing, threading, and the like. Additionally, wire 23 may be unattached to connector or coupler 30, e.g., disposed between outer enclosure 21 and sleeve 10 without being attached at either or both ends. Thus, wire 23 may be attached at both ends, one end, or neither end. While a metal base hose is depicted, the present embodiment may be utilized in connection with any of the other base hoses described herein.

FIGS. 60-64 provide several non-limiting variations of a hose assembly of the present invention, in which the hose assembly includes an extruded bendable sleeve, an underlying metal wire insert, and a fabric-covered expandable base hose. Sleeve 10 may be approximately 24 to 32 inches in length. In this embodiment, sleeve 10 is an extruded bendable sleeve; however, sleeve 10 may also be a blow-molded sleeve, an injection-molded sleeve, a rotational-molded sleeve, and the like.

Figure 62:
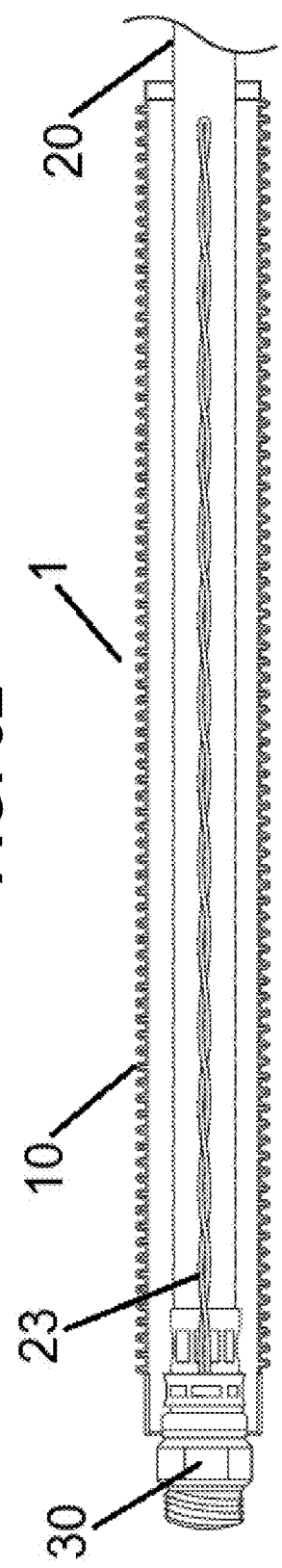
FIG. 62 shows a first cut-away view of a portion of the hose assembly of FIG. 60.
Figure 63:
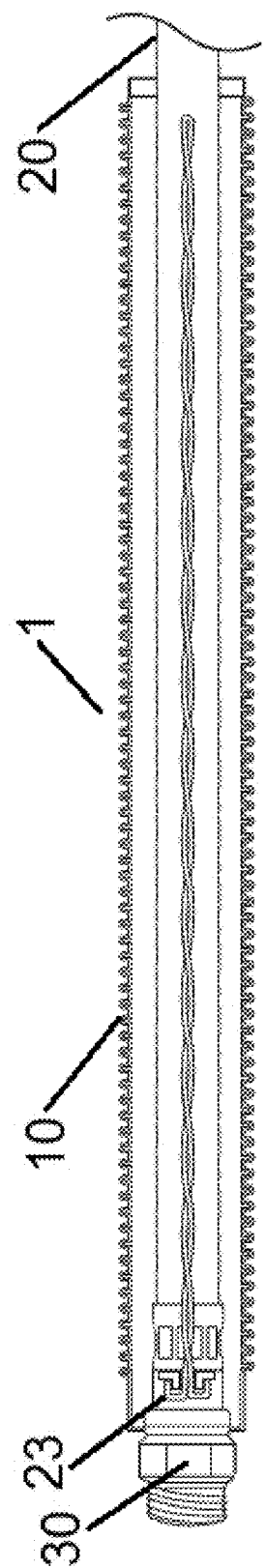
FIG. 63 shows a second cut-away view of a portion of the hose assembly of FIG. 60.
Figure 64:
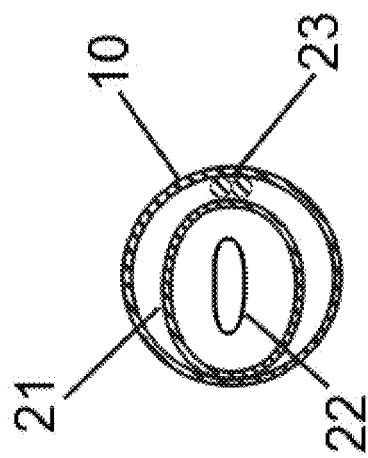
FIG. 64 shows a perpendicular cross-sectional view of a portion of the hose assembly of FIG. 60.
Figure 65:
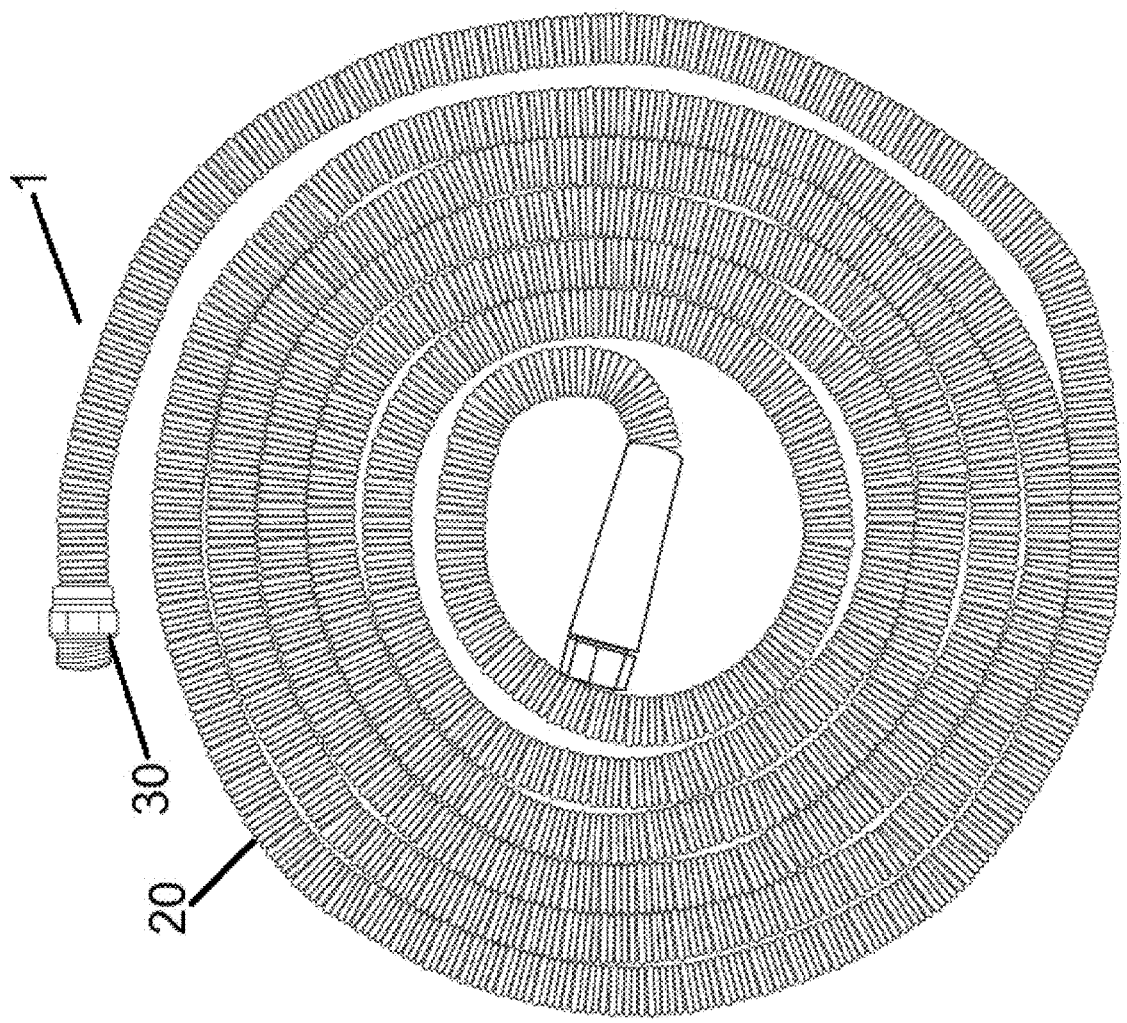
FIG. 65 shows a hose assembly having an adjustable sleeve according to one embodiment of the present invention, in which the hose assembly includes an inner gooseneck bendable sleeve and a fabric-covered expandable base hose.
Figure 66:
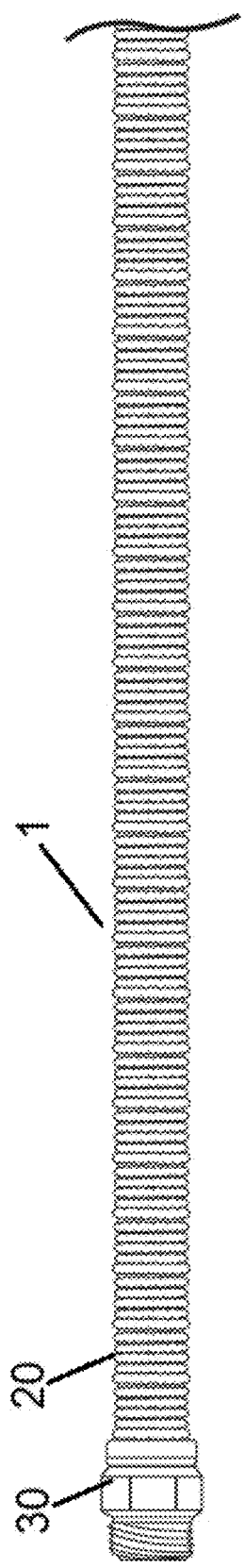
FIG. 66 shows a portion of the hose assembly of FIG. 65.

As in FIGS. 62-64, hose 20 may include outer enclosure 21, inner tube 22, and wire 23. Inner tube 22 may be a plastic tube, such as polyvinyl chloride (PVC). As in FIGS. 62-64, wire 23 may be provided between outer enclosure 21 and sleeve 10. The wire is preferably a bendable twisted wire, such as a twisted wire made of galvanized steel (2.8 mm). The twisted wire may be composed of one wire that extends a length down and then back up the hose, crossing over itself approximately every 1 inch. Connector or coupler 30 may include a crimped metal collar for securing wire 23, in which wire 23 is double-hooked onto portions of connector or coupler 30. This arrangement prevents wire 23 from slipping out of position during use. While wire 23 is attached to connector or coupler 30 by a crimping mechanism, any known attachment mechanism may be utilized, including but not limited to capping, gluing, sewing, threading, and the like. Additionally, wire 23 may be unattached to connector or coupler 30, e.g., disposed between outer enclosure 21 and sleeve 10 without being attached at either or both ends. Thus, wire 23 may be attached at both, one end, or neither end. While a fabric-covered ends, expandable base hose is depicted, the present embodiment may be utilized in connection with any of the other base hoses described herein.

FIGS. 65-68 provide several non-limiting variations of a hose assembly of the present invention, in which the hose assembly includes an inner gooseneck bendable sleeve and a fabric-covered expandable base hose. Sleeve 10 may be approximately 24 to 32 inches in length. Sleeve 10 may be an inner gooseneck bendable sleeve, such as in FIG. 67, attached by capping, crimping, gluing, sewing, and the like. In one embodiment, sleeve 10 is crimped and sealed to inner tube 22, in which inner tube 22 covers sleeve 10. Additionally, sleeve 10 may be secured at the outlet end portion.

Figure 67:
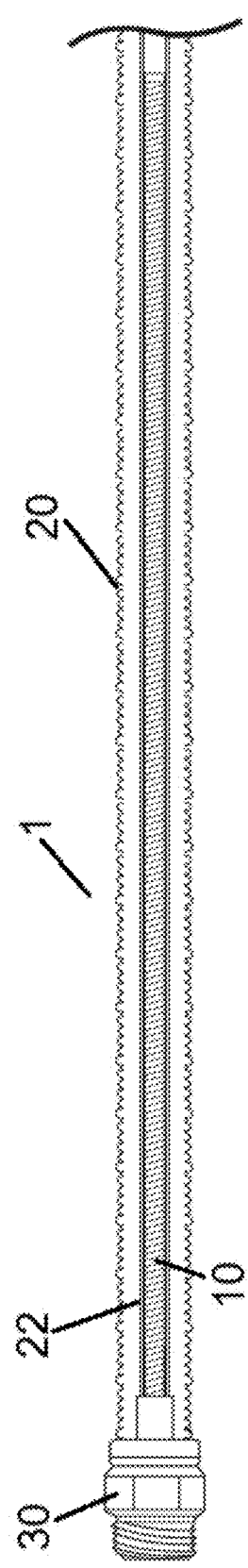
FIG. 67 shows a cut-away view of a portion of the hose assembly of FIG. 65.
Figure 68:
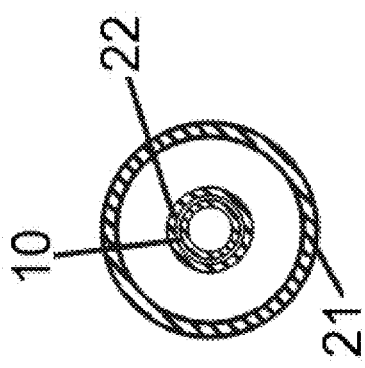
FIG. 68 shows a perpendicular cross-sectional view of a portion of the hose assembly of FIG. 65.

As in FIGS. 67-68, hose 20 may include outer enclosure 21, inner tube 22, and sleeve 10. Inner tube 22 may be a plastic tube, such as polyvinyl chloride (PVC) or other flexible plastic material. Inner tube 22 may serve as a water containment membrane positioned over sleeve 10. Sleeve 10 may permit water to flow through an inner channel of sleeve 10 and/or around an outer surface of sleeve 10. While a fabric-covered expandable base hose is depicted, the present embodiment may be utilized in connection with any of the other base hoses described herein.

In another embodiment of the present invention, the sleeve is not disposed around or within an underlying base hose but rather disposed adjacent to the base hose. In particular, the sleeve may serve as an extension or addition to the outlet end of the base hose and configured for attachment to the outlet end of the base hose. In this embodiment, outgoing water may exit the outlet end of the base hose, then enter a first end of the channel provided by the attached sleeve, and finally exit a second end of the channel provided by the sleeve. The sleeve of this embodiment may include appropriate connector or coupling means at the first and/or second ends for attachment to the base hose, a nozzle, a sprinkler, a sprayer, and the like. In this embodiment, the sleeve is a separate, reversibly attachable component. The present embodiment may be utilized in connection with any of the base hoses described herein.

The embodiments and examples above are illustrative, and many variations can be introduced to them without departing from the spirit of the disclosure or from the scope of the appended claims. For example, elements and/or features of different illustrative and exemplary embodiments herein may be combined with each other and/or substituted with each other within the scope of this disclosure. The objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

What is claimed is:

1. A hose assembly comprising:
    a garden hose having an inlet end, an outlet end, and a substantially hollow interior, wherein the garden hose comprises:
        an outlet end coupler attached at or connected to the outlet end; and
        an inlet end coupler attached at or connected to the inlet end, the inlet end coupler configured for attachment to a faucet; and
    an adjustable sleeve extending over or under at least a portion of the garden hose, wherein the adjustable sleeve has a form that is varyingly configurable, and wherein the adjustable sleeve is capable of being adjusted from a first configuration to a second configuration and maintained in the second configuration without a wire or a coil,
    wherein configuration of the adjustable sleeve correspondingly adjusts a configuration of the garden hose,
    wherein the adjustable sleeve is a ribbed tube that does not include a wire or a coil,
    wherein the garden hose is an expandable hose, a rubber hose, a metal hose, a flat hose, a fabric hose, or a fabric-covered flat hose,
    wherein the adjustable sleeve is disposed adjacent to the outlet end coupler, and
    wherein the adjustable sleeve is directly attached or connected to the outlet end coupler but not the inlet end coupler.

2. The hose assembly of claim 1, wherein the adjustable sleeve is disposed over or on top of the garden hose.

3. The hose assembly of claim 1, wherein the adjustable sleeve is disposed under or within the garden hose.

4. The hose assembly of claim 1, wherein the adjustable sleeve is fixedly or permanently attached or connected to the garden hose.

5. The hose assembly of claim 1, wherein the adjustable sleeve is reversibly attachable to and removable from the garden hose.

6. The hose assembly of claim 1, wherein the adjustable sleeve is composed of a metal, a plastic, acrylonitrile butadiene styrene (ABS), a thermoplastic, a thermoplastic elastomer, a thermoplastic rubber, or a silicone.

7. The hose assembly of claim 1, wherein the adjustable sleeve is an extruded bendable sleeve, a blow-molded sleeve, an injection-molded sleeve, or a rotational-molded sleeve.

8. The hose assembly of claim 1, wherein the adjustable sleeve is varyingly configurable over its entire length.

9. The hose assembly of claim 1, wherein the adjustable sleeve is 24 to 32 inches in length.

10. The hose assembly of claim 1, wherein the adjustable sleeve is the same length as the garden hose.

11. The hose assembly of claim 1, wherein the garden hose has a fabric or fiber outer covering and an inner elastic tube.

12. The hose assembly of claim 1, wherein the hose assembly is fixedly or removably attached to an additional component.

13. The hose assembly of claim 12, wherein the additional component is a nozzle, a sprinkler, a sprayer, or a shut-off valve.

* * * * *